US012597128B2

(12) United States Patent
Hu et al.

(10) Patent No.: US 12,597,128 B2
(45) Date of Patent: Apr. 7, 2026

(54) ASSESSMENT OF SKIN TOXICITY IN AN IN VITRO TISSUE SAMPLES USING DEEP LEARNING

(71) Applicant: Genentech, Inc., South San Francisco, CA (US)

(72) Inventors: Fang-Yao Hu, San Mateo, CA (US); Sara Francesca Santagostino, South San Francisco, CA (US)

(73) Assignee: Genentech, Inc., South San Francisco, CA (US)

( * ) Notice: Subject to any disclaimer, the term of this patent is extended or adjusted under 35 U.S.C. 154(b) by 609 days.

(21) Appl. No.: 18/100,991

(22) Filed: Jan. 24, 2023

(65) Prior Publication Data

US 2023/0162361 A1 May 25, 2023

Related U.S. Application Data

(63) Continuation of application No. PCT/US2021/043623, filed on Jul. 29, 2021.

(60) Provisional application No. 63/059,486, filed on Jul. 31, 2020.

(51) Int. Cl.
*G06T 7/00* (2017.01)
*G06T 7/10* (2017.01)

(52) U.S. Cl.
CPC .............. *G06T 7/0012* (2013.01); *G06T 7/10* (2017.01); *G06T 2207/20081* (2013.01); *G06T 2207/30041* (2013.01)

(58) Field of Classification Search
CPC .................... G06T 7/0012; G06T 7/10; G06T 2207/20081; G06T 2207/30041
See application file for complete search history.

(56) References Cited

U.S. PATENT DOCUMENTS

| | | | |
|---|---|---|---|
| 10,127,661 B2 * | 11/2018 | Wang ................... | A61B 5/0066 |
| 2019/0164287 A1 | 5/2019 | Gregson et al. | |
| 2019/0266486 A1 | 8/2019 | Yamada et al. | |
| 2021/0137912 A1 * | 5/2021 | Tiganescu .............. | A61K 45/06 |

(Continued)

FOREIGN PATENT DOCUMENTS

| | | |
|---|---|---|
| WO | 2018119077 A1 | 6/2018 |
| WO | 2018132621 A1 | 7/2018 |
| WO | 2020142556 A1 | 7/2020 |

OTHER PUBLICATIONS

De Vera Mudry, Maria Cristina, et al. "Deep learning in toxicologic pathology: a new approach to evaluate rodent retinal atrophy." Toxicologic Pathology 49.4 (2020): 851-861. (Year: 2020).*

(Continued)

*Primary Examiner* — Raphael Schwartz
(74) *Attorney, Agent, or Firm* — MORRISON & FOERSTER LLP

(57) ABSTRACT

In one embodiment, a method includes receiving a querying image associated with a tissue sample after a treatment by a drug compound, identifying a target layer of the tissue sample based on a machine-learning model trained to identify layers of tissue samples, calculating a normalized thickness of the identified target layer, and determining a toxicity indication of the treatment by the drug compound based on the normalized thickness of the identified target layer.

20 Claims, 24 Drawing Sheets

200

(56)                  References Cited

U.S. PATENT DOCUMENTS

2021/0224997 A1      7/2021  Kushida et al.

OTHER PUBLICATIONS

Cada, D.J. et al. (May 2013). "Tofacitinib," Hosp. Pharm. 48:413-424.

Caillat-Zucman, S. et al. (Dec. 1992). "Age-Dependent HLA Genetic Heterogeneity of Type 1 Insulin-Dependent Diabetes Mellitus," J. Clin. Invest. 90:2242-2250.

Danilenko, D.M. et al. (2016). "In Vitro Skin Models and Their Predictability in Defining Normal and Disease Biology, Pharmacology, and Toxicity," Toxicol. Pathol. 44(4):555-563.

De Marinis, E. et al. (2019, e-pub. Nov. 8, 2019). "Ruxolitinib Binding to Human Serum Albumin: Bioinformatics, Biochemical and Functional Characterization in JAK2V617F+ Cell Models," Sci. Rep. 9:16379, 12 pages.

De Vera Mudry, M.C. et al. (2021). "Deep Learning in Toxicologic Pathology: A New Approach to Evaluate Rodent Retinal Atrophy," Toxicol. Pathol. 49(4):851-861.

Dickson, M.A et al. (Apr. 2015, e-pub. Dec. 5, 2014). "Phase I Study of XL281 (BMS-908662), A Potent Oral RAF Kinase Inhibitor, in Patients with Advanced Solid Tumors," Invest. New Drugs 33:349-356.

Doma, E. et al. (Dec. 1, 2013, e-pub. Oct. 15, 2013). "Skin Tumorigenesis Stimulated by Raf Inhibitors Relies Upon Raf Functions That are Dependent and Independent of ERK," Cancer Res. 73(23):6926-6937.

Ekins, S. (Nov. 2016). "The Next Era: Deep Learning in Pharmaceutical Research," Pharm. Res. 33 (11):2594-2603, 17 pages.

Faller, C.. et al. (Oct. 2002). "Predictive Ability of Reconstructed Human Epidermis Equivalents for the Assessment of Skin Irritation of Cosmetics," Toxicol. In Vitro 16:557-572.

FDA (2004). "Highlights of Prescribing Information for ERBITUX (Cetuximab)," 21 pages.

FDA (2007). "Highlights of Prescribing Information for TYKERB (lapatinib)," 25 pages.

FDA (2012). "Highlights of Prescribing Information for XELJANZ (Tofacitinib)," 52 pages.

FDA (2014). "Highlights of Prescribing Information for ZYDELIG (Idelalisib)," 25 pages.

FDA (2015). "Highlights of Prescribing Information for COTEL-LIC (Cobimetinib)," 19 pages.

FDA (2015). "Highlights of Prescribing Information for IBRANCE (Palbociclib)," 23 pages.

FDA (2019). "Highlights of Prescribing Information for PIQRAY (Alpelisib)," 21 pages.

Gibson-Corley, K.N. et al. (2013). "Principles for Valid Histopathologic Scoring in Research," Vet. Pathol. 50 (6):1007-1015.

Grande, E. et al. (May 2019). "Pharmacokinetic Study of Osimertinib in Cancer Patients with Mild or Moderate Hepatic Impairment," J. Pharmacol. Exp. Ther. 369:291-299.

Hanker, A.B. et al. (Apr. 2019). "Challenges for the Clinical Development of PI3K Inhibitors: Strategies to Improve Their Impact in Solid Tumors," Cancer Discov. 9(4):482-491, 20 pages.

Hidalgo, M. et al. (Jun. 2003). "Pharmacokinetics and Pharmacodynamics: Maximizing The Clinical Potential Of Erlotinib (Tarceva)," Seminars in Oncology 30(3)(Suppl. 7):25-33.

Hilton, C.B. et al. (2020, e-pub. Apr. 3, 2020). "Personalized Predictions of Patient Outcomes During and After Hospitalization Using Artificial Intelligence," NPJ Digit. Med. 3:51, 8 pages.

Hou, D.D. et al. (2017, e-pub. Sep. 6, 2017). "Sea Buckthorn (Hippophae rhamnoides L.) Oil Improves Atopic Dermatitis-Like Skin Lesions via Inhibition of NF-kappaB and STAT1 Activation," Skin Pharmacol. Physiol. 30 (5):268-276.

Hu, F et al. (Dec. 15, 2017). "Distinct Angiogenic Changes During Carcinogenesis Defined by Novel Label-Free Dark-Field Imaging in a Hamster Cheek Pouch Model," Cancer Res. 77(24):7109-7119, 19 pages.

Hu, F. et al. (2020). "Ovarian Toxicity Assessment in Histopathological Images Using Deep Learning," Toxicol. Pathol. 48(2):350-361.

Hu, F. et al. (Sep. 1, 2016, e-pub. Aug. 5, 2016). "Dark Field Optical Imaging Reveals Vascular Changes in an Inducible Hamster Cheek Pouch Model During Carcinogenesis," Biomed. Opt. Express 7(9):3247-3261.

Ibragimov, B. et al. (Oct. 2018, e-pub. Sep. 10, 2018). "Development of Deep Neural Network for Individualized Hepatobiliary Toxicity Prediction After Liver SBRT," Med. Phys. 45(10):4763-4774.

Jost, M. et al. (Oct.-Nov. 2000). "The EGF Receptor—An Essential Regulator of Multiple Epidermal Functions," Eur. J. Dermatol. 10(7):505-510, 12 pages.

Kandárová, H. et al. (2005). "The EpiDerm Test Protocol for the Upcoming ECVAM Validation Study on In Vitro Skin Irritation Tests—An Assessment of the Performance of the Optimised Test," Altern. Lab Anim. 33:351-367.

Kandarová, H. et al. (2006, e-pub. Feb. 7, 2006). "Assessment of the Human Epidermis Model SkinEthic RHE for In Vitro Skin Corrosion Testing of Chemicals According to New OECD TG 431," Toxicol. In Vitro 20:547-559.

Lacouture, M.E. (Oct. 2006). "Mechanisms of Cutaneous Toxicities to EGFR Inhibitors," Nat. Rev. Cancer 6 (10):803-812.

Lai, S.E. et al. (Jan. 20, 2007). "Hand-Foot and Stump Syndrome to Sorafenib," J. Clin. Oncol. 25(3):341-343, 5 pages.

Lecun, Y. et al. (2015). "Deep Learning," Nature 521(7553):436-444.

Lin, Y. et al. (Dec. 21, 2020). "A Measurement of Epidermal Thickness of Fingertip Skin from OCT Images Using Convolutional Neural Network," Journal of Innovative Optical Health Sciences 14(1):2140005, 7 pages.

Lolkema, M.P. et al. (May 15, 2015). "The c-Met Tyrosine Kinase Inhibitor JNJ-38877605 Causes Renal Toxicity Through Species-Specific Insoluble Metabolite Formation," Clin. Cancer Res. 21(10):2297-2304, 17 pages.

MacDonald, J.B. et al. (Feb. 2015). "Cutaneous Adverse Effects of Targeted Therapies: Part II: Inhibitors of Intracellular Molecular Signaling Pathways," J. Am. Acad. Dermatol. 72:221-237, Quiz 237-238.

Maddah, M. et al. (2020, e-pub. Jul. 3, 2020). "Quantifying Drug-Induced Structural Toxicity in Hepatocytes and Cardiomyocytes Derived from hiPSCs Using a Deep Learning Method," J. Pharmacol. Toxicol. Methods 105:106895, 13 pages.

Mandalà, M. et al. (Nov. 2013, e-pub. Jul. 3, 2013). "Cutaneous Toxicities of BRAF Inhibitors: Clinical and Pathological Challenges and Call to Action," Crit. Rev. Oncol. Hematol. 88(2):318-337.

Manousaridis, I. et al. (Jan. 2013, e-pub. Apr. 28, 2012). "Cutaneous Side Effects of Inhibitors of the RAS/RAF/MEK/ERK Signalling Pathway and Their Management," J. Eur. Acad. Dermatol Venereol 27(1):11-18.

Minami, H. et al. (Jul. 2008, e-pub. May 12, 2008). "Phase I and Pharmacokinetic Study of Sorafenib, An Oral Multikinase Inhibitor, in Japanese Patients with Advanced Refractory Solid Tumors," Cancer Sci. 99(7):1492-1498.

Noh, Y.-H. (2015, e-pub. Nov. 7, 2014). "Population Pharmacokinetics of HM781-36 (poziotinib), Pan-Human EGF Receptor (HER) Inhibitor, and its Two Metabolites in Patients with Advanced Solid Malignancies," Cancer Chemother. Pharmacol. 75:97-109.

Nunnery, S.E. et al. (Dec. 2019, e-pub. Oct. 18, 2019). "Management of Toxicity to Isoform Alpha-Specific PI3K Inhibitors," Ann. Oncol. 30(Suppl 10):x21-x26.

Park, S.R. et al. (2016, e-pub. Sep. 1, 2015). "Severe Imatinib-Associated Skin Rash in Gastrointestinal Stromal Tumor Patients: Management and Clinical Implications," Cancer Res. Treat. 48(1):162-170.

Pastore, S. et al. (2008, e-pub. Nov. 29, 2007). "The Epidermal Growth Factor Receptor System in Skin Repair and Inflammation," J. Invest. Dermatol. 128:1365-1374.

Peng, B. et al. (Mar. 1, 2004). "Pharmacokinetics and Pharmacodynamics of Imatinib in a Phase I Trial with Chronic Myeloid Leukemia Patients," J. Clin. Oncol. 22(6):935-942.

Piper, W.L et al. (Dec. 2014). "Drug Monographs: Belinostat and Idelalisib," Hosp. Pharm. 49(11): 1009-1013.

(56)          References Cited

OTHER PUBLICATIONS

Rizzo, H.L. et al. (2011, e-pub. Dec. 20, 2010). "IL-23-Mediated Psoriasis-Like Epidermal Hyperplasia is Dependent on IL-17A," J. Immunol. 186:1495-1502.

Salphati, L. et al. (2011). "Preclinical Pharmacokinetics of the Novel PI3K Inhibitor GDC-0941 and Prediction of its Pharmacokinetics and Efficacy in Human," Xenobiotica 41:1088-1099, 12 pages.

Sarker, D. et al. (Jan. 1, 2015). "First-In-Human Phase I Study of Pictilisib (GDC-0941), A Potent Pan-Class I Phosphatidylinositol-3-Kinase (PI3K) Inhibitor, in Patients with Advanced Solid Tumors," Clin Cancer Res. 21(1):77-86, 19 pages.

Schneider, M.R. et al. (Jul. 2008). "Beyond Wavy Hairs: The Epidermal Growth Factor Receptor and its Ligands in Skin Biology and Pathology," Am. J. Pathol. 173(1):14-24.

Schwartz, G.K. et al. (May 2, 2009). "A Phase I Study of XL281, A Selective Oral RAF Kinase Inhibitor, in Patients (Pts) with Advanced Solid Tumors," Journal of Clinical Oncology 27:3513, 3 pages.

Scope, A. et al. (Dec. 1, 2007). "Randomized Double-Blind Trial of Prophylactic Oral Minocycline and Topical Tazarotene for Cetuximab-Associated Acne-Like Eruption," Journal of Clinical Oncology 25(34):5390-5396.

Senior, A.W. et al. (2020). "AlphaFold: Improved Protein Structure Prediction Using Potentials from Deep Learning," Nature 577:706-710, 28 pages.

Shilling, A.D. et al. (2010). "Metabolism, Excretion, and Pharmacokinetics of [14C]INCB018424, A Selective Janus Tyrosine Kinase 1/2 Inhibitor, in Humans," Drug Metab. Dispos. 38(11):2023-2031.

Srivastava, A. et al. (Jul. 2020, e-pub. Nov. 2, 2020). "Quantitative Neurotoxicology: Potential Role of Artificial Intelligence/Deep Learning Approach," J. Appl. Toxicol. 41:996-1006.

Tamura, K. et al. (Jun. 2016). "Phase I Study of Palbociclib, A Cyclin-Dependent Kinase 4/6 Inhibitor, In Japanese Patients," Cancer Sci. 107(6):755-763.

Tokarz, D.A. et al. (2021). "Using Artificial Intelligence to Detect, Classify, and Objectively Score Severity of Rodent Cardiomyopathy," Toxicol. Pathol. 49(4):888-896.

Tran, Q.T. et al. (2012). "EGFR Regulation of Epidermal Barrier Function," Physiol. Genomics 44:455-469, 50 pages.

Turin, S.Y. et al. (Jun. 2018). "Digital Analysis Yields More Reliable and Accurate Measures of Dermal and Epidermal Thickness in Histologically Processed Specimens Compared to Traditional Methods," Exp. Dermatol. 27(6):687-690.

Wind, S. et al. (2017, e-pub. Jul. 28, 2016). "Clinical Pharmacokinetics and Pharmacodynamics of Afatinib," Clin. Pharmacokinet. 56:235-250.

Yamazaki, S. et al. (Mar. 2011). "Prediction of Oral Pharmacokinetics of cMet Kinase Inhibitors in Humans: Physiologically Based Pharmacokinetic Model Versus Traditional One-Compartment Model," Drug Metab. Dispos. 39(3):383-393.

Zuraw, A. et al. (2021). "Developing a Qualification and Verification Strategy for Digital Tissue Image Analysis in Toxicological Pathology," Toxicol. Pathol. 49(4):773-783.

De Sisternes, L. et al. (May 2016, e-pub. Mar. 17, 2016). "Analysis of Inner and Outer Retinal Thickness in Patients Using Hydroxychloroquine Prior to Development of Retinopathy," JAMA Ophthalmology 134(5):511-519.

International Preliminary Report on Patentability, issued Jan. 31, 2023, for PCT Application No. PCT/US2021/043623, filed Jul. 29, 2021, 10 pages.

International Search Report and Written Opinion, mailed Nov. 4, 2021, for PCT Application No. PCT/US2021/043623, filed Jul. 29, 2021, 13 pages.

Jimenez-Carretero, D. et al. (Nov. 30, 2018, e-pub. Oct. 21, 2021). "Tox_(R)CNN: Deep Learning-Based Nuclei Profiling Tool for Drug Toxicity Screening," Plos Computational Biology 14(11):e1006238, 23 pages.

Del Amor, R. et al. (Sep. 2, 2019). "Towards Automatic Glaucoma Assessment: An Encoder-Decoder CNN for Retinal Layer Segmentation in Rodent OCT Images," 2019 27th EUSIPICO. 6 pages.

* cited by examiner

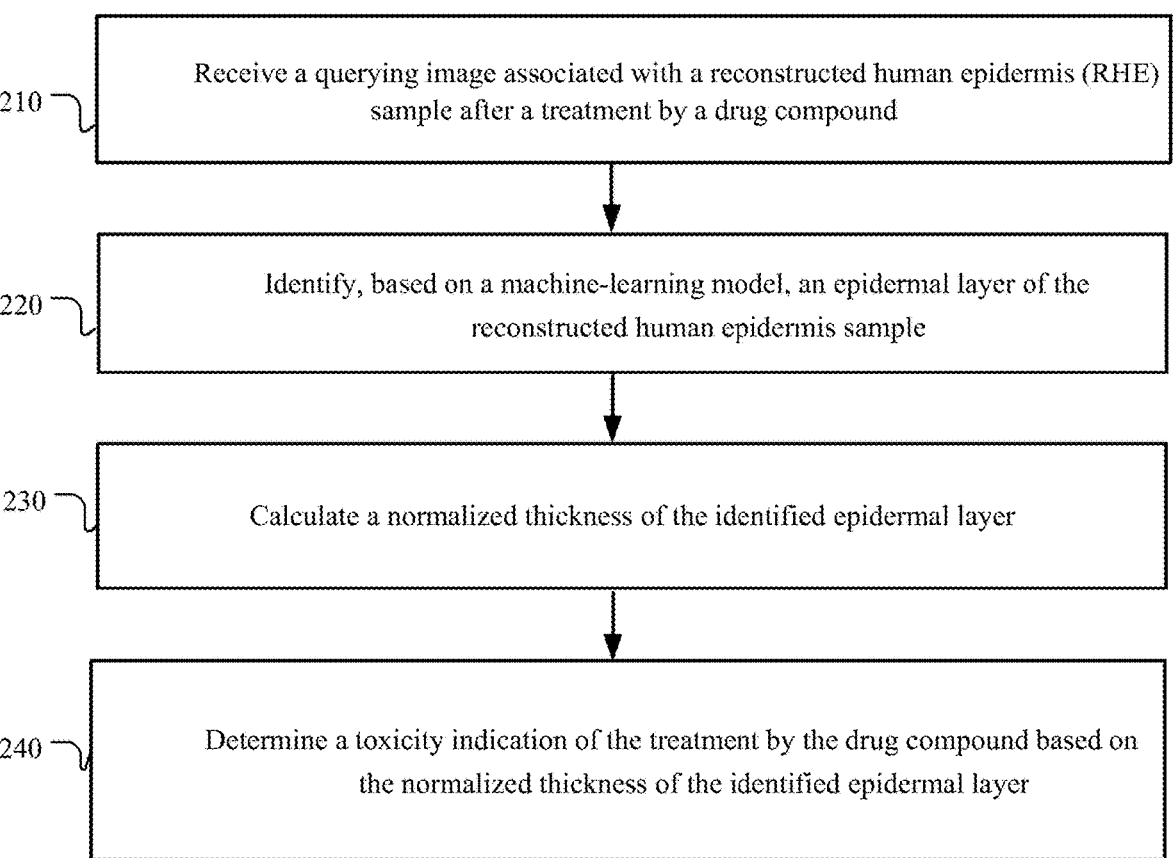

200

210 — Receive a querying image associated with a reconstructed human epidermis (RHE) sample after a treatment by a drug compound 220 — Identify, based on a machine-learning model, an epidermal layer of the reconstructed human epidermis sample 230 — Calculate a normalized thickness of the identified epidermal layer 240 — Determine a toxicity indication of the treatment by the drug compound based on the normalized thickness of the identified epidermal layer

Viable
Epidermal
Layer
312

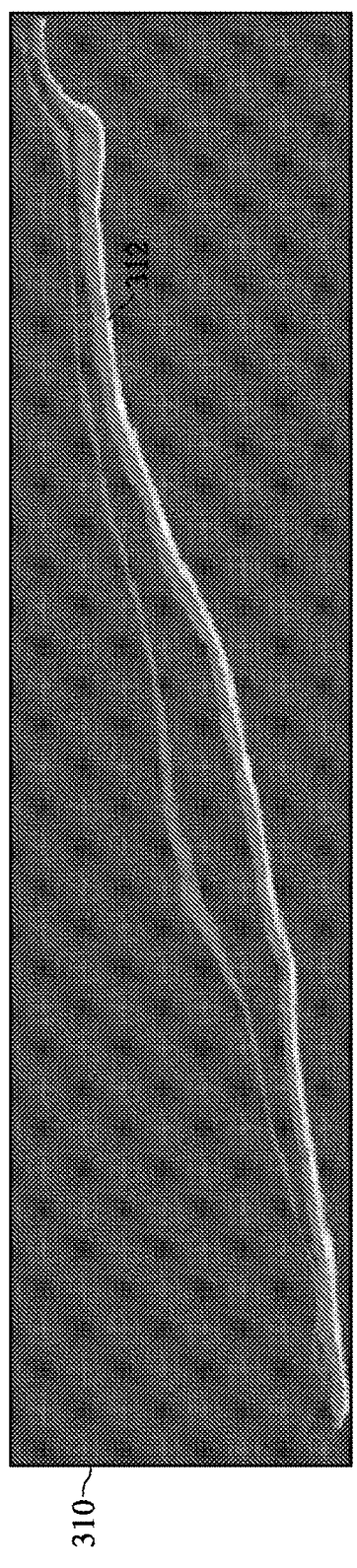
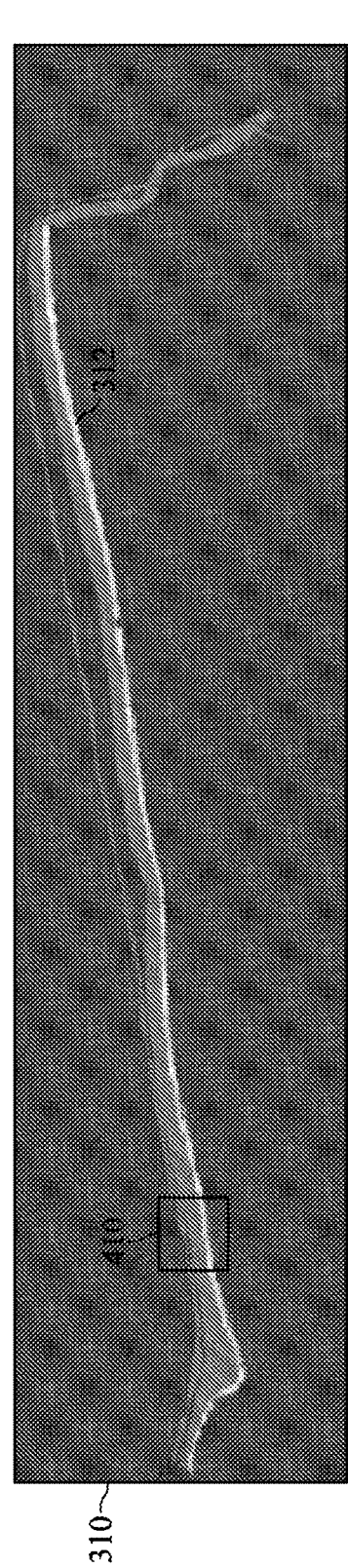
FIG. 4B

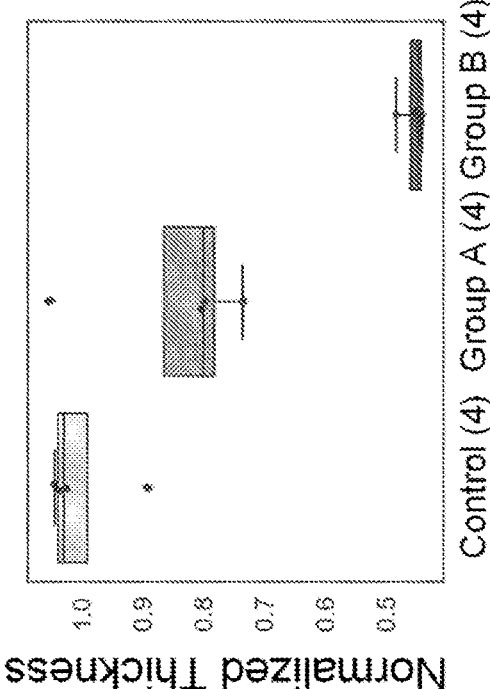
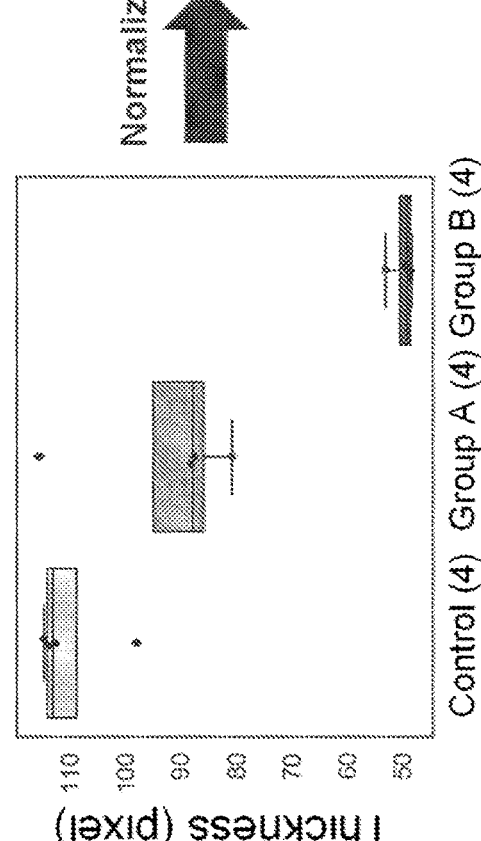
FIG. 5C

Manual (Random 1 Locations) vs. Algorithm

Manual (Random 3 Locations) vs. Algorithm

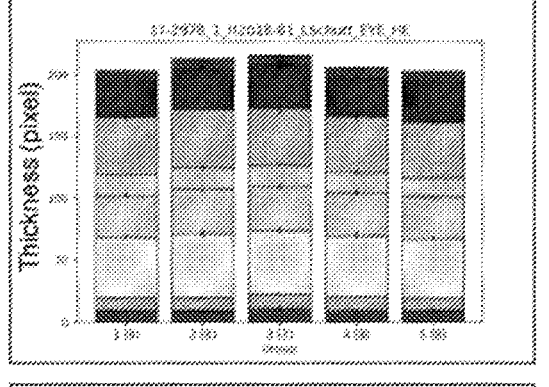
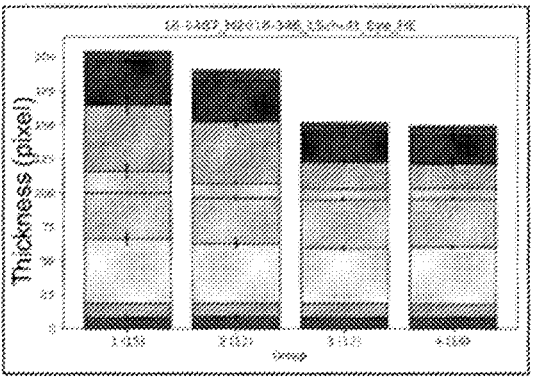
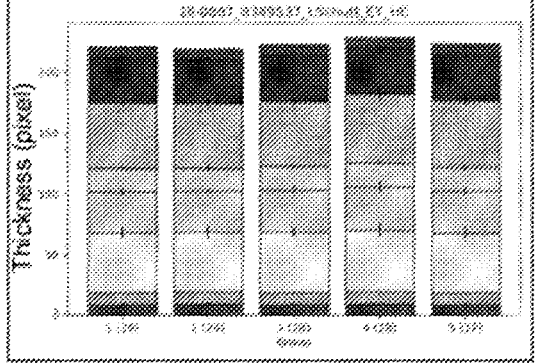
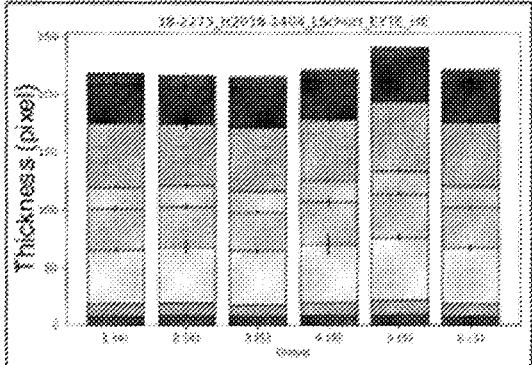
FIG. 14A

ASSESSMENT OF SKIN TOXICITY IN AN IN VITRO TISSUE SAMPLES USING DEEP LEARNING

PRIORITY

This application is a continuation of International Application No. PCT/US2021/043623, filed on Jul. 29, 2021, which claims the benefit, under 35 U.S.C. § 119 (e), of U.S. Provisional Patent Application No. 63/059,486, filed 31 Jul. 2020, which is incorporated herein by reference.

FIELD OF THE INVENTION

The present disclosure relates to a system and methods using machine-learning algorithms, such as deep learning, to evaluate tissue sample(s) comprising multiple layers.

INTRODUCTION

The skin consists of two main layers: the epidermis, a thin stratified epithelium primarily composed of keratinocytes, and the dermis, a thick layer derived from mesenchymal cells. Any disruption of cell cycle or differentiation of the keratinocyte results in a disturbed skin barrier leading to changes in epidermal thickness and compromised function. The epidermal growth factor receptor (EGFR) regulates multiple functions in the keratinocyte including proliferation, adhesion and migration, survival, and differentiation. EGFR mutants are therefore frequently associated with several cancers including breast, lung, ovarian, cervical, bladder, esophageal, brain, head, and neck cancers. Therapies that target mutant EGFR display on-target effects in the skin with evidence of rash, making skin toxicity a leading cause of dose reduction, or treatment termination, and poor prognosis in patients undergoing cancer therapy, should the severity of rash be life-threatening. Similarly, maculopapular rash and/or acneiform eruptions of variable severity have been observed in patients treated with drugs targeting the mitogen-activated protein kinase (MAPK) and the phosphoinositide 3-kinase (PI3K) pathways, and closely mirror the cutaneous toxicity profile described for EGFR-targeting compounds in its onset, course and treatment. Skin toxicity is a common safety concern associated with drugs that inhibit epidermal growth factor receptors as well as other targets involved in epidermal growth and differentiation. Severe skin toxicity may lead to outcomes such as warning language added to a drug label, dose reduction or termination, or poor prognosis of EGFR-targeted cancer therapy. Recently, the use of a 3D reconstructed human epidermis model enabled large-scale drug screening and demonstrated potential for predicting skin toxicity.

To combat the shortcomings of manually collected data, machine learning models designed to recognize and classify data are now used across disciplines from cancer detection and monitoring to drug development and safety assessment and across tissue sample types. However, traditional machine learning algorithms cannot be trained on raw data but instead require time-intensive training on input datasets with well-defined data features. These features must be iteratively refined to improve the predictive capabilities of the model. Deep learning models based on neural networks have been developed to overcome limitations such as these. Deep learning takes advantage of large datasets and general-purpose, non-linear learning algorithms to train multiple hidden, processing layers that are responsible for identifying different data features. The model itself defines these features based on the input data.

Deep learning models can also be used in image analysis, segmentation, and classification provided sufficiently large training sets of images are available with corresponding annotated, pixel level data. Deep learning has been applied to many areas of medical imaging and drug toxicology. Other deep learning methods take advantage of toxicity-induced structural alterations in cells or tissues. This method has been used in vitro to assess toxicity based on changes in fluorescently stained cell nuclei and to identify drug-induced structural changes in cardiomyocytes and hepatocytes that are too subtle for standard image analysis. Deep learning-based image analysis has also been applied to in vivo rodent models for ovarian toxicity as well as drug-induced retinal atrophy and cardiomyopathy. Furthermore, a deep learning model was developed to predict radiation-induced toxicity in patients undergoing treatment for cancers of the hepatobiliary system. Finally, deep-learning methods have been suggested as a means for identifying neurotoxicity using the robust segmentation framework that has already been developed for brain imaging.

SUMMARY OF PARTICULAR EMBODIMENTS

Herein is provided a system and methods which relate to the evaluation of tissue samples comprising multiple layers, including, but not limited to the determination of skin toxicity of reconstituted human epidermis samples.

With respect to human epidermis samples, although a decrease in epidermal thickness has been observed when 3-D reconstructed tissues are exposed to drugs causing skin toxicity, the thickness evaluation of epidermal layers from a pathologist is subjective and not easily reproducible nor scalable. In addition, the subtle thickness differences among tissues as well as the large number of samples to test can make cross-study comparison difficult when a manual evaluation strategy is employed. The embodiments disclosed herein use deep learning and image processing algorithms to assess and measure the thickness of particular layers of tissue samples and determine particular conditions or effects indicated by the samples. For example, in particular embodiments, deep learning and image processing algorithms can be used to measure the viable epidermal thickness from multiple studies. Empirical studies demonstrated that the thickness measured using techniques described herein was not only significantly correlated with a pathologist's semi-quantitative evaluation but in close agreement with the quantitative measurement performed by pathologists. Moreover, a sensitivity of 0.8 and specificity of 0.75 was achieved when predicting the toxicity of 18 compounds with clinical observations using the epidermal thickness measuring approaches of the embodiments disclosed herein. The approach in the embodiments disclosed herein may be fully-automated, reproducible, transferrable and highly scalable, which not only demonstrates reasonable accuracy in predicting skin toxicity but enables cross-study comparison, high-throughput compound screening, and expansion to additional types of tissue samples.

In particular embodiments, a digital pathology image processing system may receive a querying image associated with a tissue sample after a treatment by a drug compound. The digital pathology image processing system may then identify, based on a machine-learning model trained to identify layers of tissue samples, a target layer of the tissue sample. The digital pathology image processing system may further calculate a normalized thickness of the identified target layer. In particular embodiments, the digital pathology image processing system may determine a toxicity indication of the treatment by the drug compound based on the normalized thickness of the identified target layer.

BRIEF DESCRIPTION OF THE DRAWINGS

FIG. 2 illustrates an example method for determining skin toxicity of reconstituted human epidermis samples.

FIG. 4B illustrates an example annotation of an RHE sample with an example tile.

FIG. 5C illustrates an example normalization of the tissue thickness.

FIGS. 14A-14B illustrates example measured tissue segment thickness.

DESCRIPTION

Figure 1:
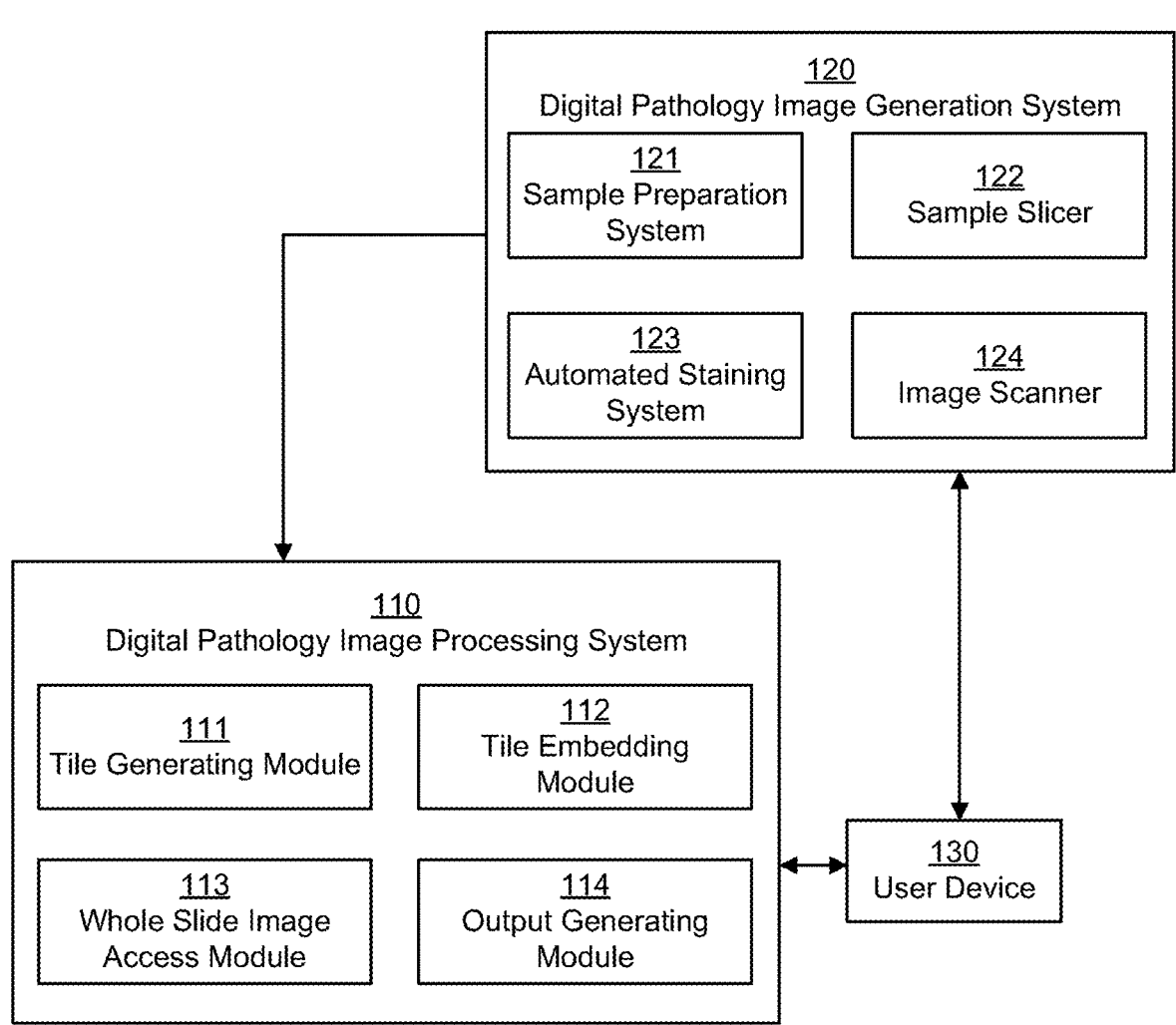
FIG. 1 illustrates a network of interacting computer systems that can be used, as described herein according to some embodiments of the present disclosure.

FIG. 1 illustrates a network 100 of interacting computer systems that can be used, as described herein according to some embodiments of the present disclosure.

A digital pathology image generation system 120 can generate one or more whole slide images or other related digital pathology images, corresponding to a particular sample. For example, an image generated by digital pathology image generation system 120 can include a stained section of a biopsy sample. As another example, an image generated by digital pathology image generation system 120 can include a slide image (e.g., a blood film) of a liquid sample. As another example, an image generated by digital pathology image generation system 120 can include fluorescence microscopy such as a slide image depicting fluorescence in situ hybridization (FISH) after a fluorescent probe has been bound to a target DNA or RNA sequence.

Some types of samples (e.g., biopsies, solid samples and/or samples including tissue) can be processed by a sample preparation system 121 to fix and/or embed the sample. Sample preparation system 121 can facilitate infiltrating the sample with a fixating agent (e.g., liquid fixing agent, such as a formaldehyde solution) and/or embedding substance (e.g., a histological wax). For example, a sample fixation sub-system can fix a sample by exposing the sample to a fixating agent for at least a threshold amount of time (e.g., at least 3 hours, at least 6 hours, or at least 13 hours). A dehydration sub-system can dehydrate the sample (e.g., by exposing the fixed sample and/or a portion of the fixed sample to one or more ethanol solutions) and potentially clear the dehydrated sample using a clearing intermediate agent (e.g., that includes ethanol and a histological wax). A sample embedding sub-system can infiltrate the sample (e.g., one or more times for corresponding predefined time periods) with a heated (e.g., and thus liquid) histological wax. The histological wax can include a paraffin wax and potentially one or more resins (e.g., styrene or polyethylene). The sample and wax can then be cooled, and the wax-infiltrated sample can then be blocked out.

A sample slicer 122 can receive the fixed and embedded sample and can produce a set of sections. Sample slicer 122 can expose the fixed and embedded sample to cool or cold temperatures. Sample slicer 122 can then cut the chilled sample (or a trimmed version thereof) to produce a set of sections. Each section can have a thickness that is (for example) less than 100 μm, less than 50 μm, less than 10 μm or less than 5 μm. Each section can have a thickness that is (for example) greater than 0.1 μm, greater than 1 μm, greater than 2 μm or greater than 4 μm. The cutting of the chilled sample can be performed in a warm water bath (e.g., at a temperature of at least 30° C., at least 35° C. or at least 40° C.).

An automated staining system 123 can facilitate staining one or more of the sample sections by exposing each section to one or more staining agents. Each section can be exposed to a predefined volume of staining agent for a predefined period of time. In some instances, a single section is concurrently or sequentially exposed to multiple staining agents.

Each of one or more stained sections can be presented to an image scanner 124, which can capture a digital image of the section. Image scanner 124 can include a microscope camera. The image scanner 124 can capture the digital image at multiple levels of magnification (e.g., using a 10× objective, 20× objective, 40× objective, etc.). Manipulation of the image can be used to capture a selected portion of the sample at the desired range of magnifications. Image scanner 124 can further capture annotations and/or morphometrics identified by a human operator. In some instances, a section is returned to automated staining system 123 after one or more images are captured, such that the section can be washed, exposed to one or more other stains, and imaged again. When multiple stains are used, the stains can be selected to have different color profiles, such that a first region of an image corresponding to a first section portion that absorbed a large amount of a first stain can be distinguished from a second region of the image (or a different image) corresponding to a second section portion that absorbed a large amount of a second stain.

It will be appreciated that one or more components of digital pathology image generation system 120 can, in some instances, operate in connection with human operators. For example, human operators can move the sample across various sub-systems (e.g., of sample preparation system 121 or of digital pathology image generation system 120) and/or initiate or terminate operation of one or more sub-systems, systems, or components of digital pathology image generation system 120. As another example, part or all of one or more components of digital pathology image generation system (e.g., one or more subsystems of the sample preparation system 121) can be partly or entirely replaced with actions of a human operator.

Further, it will be appreciated that, while various described and depicted functions and components of digital pathology image generation system 120 pertain to processing of a solid and/or biopsy sample, other embodiments can relate to a liquid sample (e.g., a blood sample). For example, digital pathology image generation system 120 can receive a liquid-sample (e.g., blood or urine) slide, that includes a base slide, smeared liquid sample and cover. Image scanner 124 can then capture an image of the sample slide. Further embodiments of the digital pathology image generation system 120 can relate to capturing images of samples using advancing imaging techniques, such as FISH, described herein. For example, once a florescent probe has been introduced to a sample and allowed to bind to a target sequence appropriate imaging can be used to capture images of the sample for further analysis.

A given sample can be associated with one or more users (e.g., one or more physicians, laboratory technicians and/or medical providers) during processing and imaging. An associated user can include, by way of example and not of limitation, a person who ordered a test or biopsy that produced a sample being imaged, a person with permission to receive results of a test or biopsy, or a person who conducted analysis of the test or biopsy sample, among others. For example, a user can correspond to a physician, a pathologist, a clinician, or a subject. A user can use one or one user devices 130 to submit one or more requests (e.g., that identify a subject) that a sample be processed by digital pathology image generation system 120 and that a resulting image be processed by a digital pathology image processing system 110.

Digital pathology image generation system 120 can transmit an image produced by image scanner 124 back to user device 130. User device 130 then communicates with the digital pathology image processing system 110 to initiate automated processing of the image. In some instances, digital pathology image generation system 120 provides an image produced by image scanner 124 to the digital pathology image processing system 110 directly, e.g. at the direction of the user of a user device 130. Although not illustrated, other intermediary devices (e.g., data stores of a server connected to the digital pathology image generation system 120 or digital pathology image processing system 110) can also be used. Additionally, for the sake of simplicity only one digital pathology image processing system 110, image generating system 120, and user device 130 is illustrated in the network 100. This disclosure anticipates the use of one or more of each type of system and component thereof without necessarily deviating from the teachings of this disclosure.

The network 100 and associated systems shown in FIG. 1 can be used in a variety of contexts where scanning and evaluation of digital pathology images, such as whole slide images, are an essential component of the work. As an example, the network 100 can be associated with a clinical environment, where a user is evaluating the sample for possible diagnostic purposes. The user can review the image using the user device 130 prior to providing the image to the digital pathology image processing system 110. The user can provide additional information to the digital pathology image processing system 110 that can be used to guide or direct the analysis of the image by the digital pathology image processing system 110. For example, the user can provide a prospective diagnosis or preliminary assessment of features within the scan. The user can also provide additional context, such as the type of tissue being reviewed. As another example, the network 100 can be associated with a laboratory environment were tissues are being examined, for example, to determine the efficacy or potential side effects of a drug. In this context, it can be commonplace for multiple types of tissues to be submitted for review to determine the effects on the whole body of said drug. This can present a particular challenge to human scan reviewers, who may need to determine the various contexts of the images, which can be highly dependent on the type of tissue being imaged. These contexts can optionally be provided to the digital pathology image processing system 110.

Digital pathology image processing system 110 can process digital pathology images, including whole slide images, to classify the digital pathology images and generate annotations for the digital pathology images and related output. As an example, the digital pathology image processing system 110 can process whole slide images of tissue samples or tiles of the whole slide images of tissue samples generated by the digital pathology image processing system 110, to identify layers of each tissue sample, compute thickness of each layer, and provide a toxicity assessment based on the computed thickness. The digital pathology image processing system 110 may use sliding windows to generate a mask over the layers. Besides for identifying the tissue sections, the mask may be also used for measuring thickness, determining areas of the layer, determining lengths for different endpoints, and determining curviness for tortuosity, and measuring volume in a three-dimensional scenario. The digital pathology image processing system 110 may then crop the querying image into a plurality of image tiles. A tile generating module 111 can define a set of tiles for each digital pathology image. To define the set of tiles, the tile generating module 111 can segment the digital pathology image into the set of tiles. As embodied herein, the tiles can be non-overlapping (e.g., each tile includes pixels of the image not included in any other tile) or overlapping (e.g., each tile includes some portion of pixels of the image that are included in at least one other tile). Features such as whether or not tiles overlap, in addition to the size of each tile and the stride of the window (e.g., the image distance or pixels between a tile and a subsequent tile) can increase or decrease the data set for analysis, with more tiles (e.g., through overlapping or smaller tiles) increasing the potential resolution of eventual output and visualizations. In some instances, tile generating module 111 defines a set of tiles for an image where each tile is of a predefined size and/or an offset between tiles is predefined. Continuing with the example of tissue samples, for each tissue section, the identified tissue area may be cropped into image tiles with width and height of certain number of pixels. Furthermore, the tile generating module 111 can create multiple sets of tiles of varying size, overlap, step size, etc., for each image. As an example, the width and height of pixels may be dynamically determined (i.e., not fixed) based on factors such as the evaluation task, the querying image itself, or any suitable factor. In some embodiments, the digital pathology image itself can contain tile overlap, which may result from the imaging technique. Even segmentation without tile overlapping can be a preferable solution to balance tile processing requirements and avoid influencing the embedding generation and weighting value generation discussed herein. A tile size or tile offset can be determined, for example, by calculating one or more performance metrics (e.g., precision, recall, accuracy, and/or error) for each size/offset and by selecting a tile size and/or offset associated with one or more performance metrics above a predetermined threshold and/or associated with one or more performance metric(s) (e.g., high precision, high recall, high accuracy, and/or low error).

The tile generating module 111 may further define a tile size depending on the type of abnormality being detected. For example, the tile generating module 111 can be configured with awareness of the type(s) of tissue abnormalities that the digital pathology image processing system 110 will be searching for and can customize the tile size according to the tissue abnormalities to improve detection. For example, the image generating module 111 can determine that, when the tissue abnormalities include searching for inflammation or necrosis in lung tissue, the tile size should be reduced to increase the scanning rate, while when the tissue abnormalities include abnormalities with Kupffer cells in liver tissues, the tile size should be increased to increase the opportunities for the digital pathology image processing system 110 to analyze the Kupffer cells holistically. In some instances, tile generating module 111 defines a set of tiles where a number of tiles in the set, size of the tiles of the set, resolution of the tiles for the set, or other related properties, for each image is defined and held constant for each of one or more images.

As embodied herein, the tile generating module 111 can further define the set of tiles for each digital pathology image along one or more color channels or color combinations. As an example, digital pathology images received by digital pathology image processing system 110 can include large-format multi-color channel images having pixel color values for each pixel of the image specified for one of several color channels. Example color specifications or color spaces that can be used include the RGB, CMYK, HSL, HSV, or HSB color specifications. The set of tiles can be defined based on segmenting the color channels and/or generating a brightness map or greyscale equivalent of each tile. For example, for each segment of an image, the tile generating module 111 can provide a red tile, blue tile, green tile, and/or brightness tile, or the equivalent for the color specification used. As explained herein, segmenting the digital pathology images based on segments of the image and/or color values of the segments can improve the accuracy and recognition rates of the networks used to generating embeddings for the tiles and image and to produce classifications of the image. Additionally, the digital pathology image processing system 110, e.g., using tile generating module 111, can convert between color specifications and/or prepare copies of the tiles using multiple color specifications. Color specification conversions can be selected based on a desired type of image augmentation (e.g., accentuating or boosting particular color channels, saturation levels, brightness levels, etc.). Color specification conversions can also be selected to improve compatibility between digital pathology image generation systems 120 and the digital pathology image processing system 110. For example, a particular image scanning component can provide output in the HSL color specification and the models used in the digital pathology image processing system 110, as described herein, can be trained using RGB images. Converting the tiles to the compatible color specification can ensure the tiles can still be analyzed. Additionally, the digital pathology image processing system can up-sample or down-sample images that are provided in particular color depth (e.g., 8-bit, 1-bit, etc.) to be usable by the digital pathology image processing system. Furthermore, the digital pathology image processing system 110 can cause tiles to be converted according to the type of image that has been captured (e.g., fluorescent images may include greater detail on color intensity or a wider range of colors).

As described herein, a tile embedding module 112 can generate an embedding for each tile in a corresponding feature embedding space. The embedding can be represented by the digital pathology image processing system 110 as a feature vector for the tile. The tile embedding module 112 can use a neural network (e.g., a convolutional neural network) to generate a feature vector that represents each tile of the image. In particular embodiments, the tile embedding neural network can be based on the ResNet image network trained on a dataset based on natural (e.g., non-medical) images, such as the ImageNet dataset. By using a non-specialized tile embedding network, the tile embedding module 112 can leverage known advances in efficiently processing images to generating embeddings. Furthermore, using a natural image dataset allows the embedding neural network to learn to discern differences between tile segments on a holistic level.

In other embodiments, the tile embedding network used by the tile embedding module 112 can be an embedding network customized to handle large numbers of tiles of large format images, such as digital pathology whole slide images. Additionally, the tile embedding network used by the tile embedding module 112 can be trained using a custom dataset. For example, the tile embedding network can be trained using a variety of samples of whole slide images or even trained using samples relevant to the subject matter for which the embedding network will be generating embeddings (e.g., scans of particular tissue types). Training the tile embedding network using specialized or customized sets of images can allow the tile embedding network to identify finer differences between tiles which can result in more detailed and accurate distances between tiles in the feature embedding space at the cost of additional time to acquire the images and the computational and economic cost of training multiple tile generating networks for use by the tile embedding module 112. The tile embedding module 112 can select from a library of tile embedding networks based on the type of images being processed by the digital pathology image processing system 110.

As described herein, tile embeddings can be generated from a deep learning neural network using visual features of the tiles. Tile embeddings can be further generated from contextual information associated with the tiles or from the content shown in the tile. For example, a tile embedding can include one or more features that indicate and/or correspond to a size of depicted objects (e.g., sizes of depicted cells or aberrations) and/or density of depicted objects (e.g., a density of depicted cells or aberrations). Size and density can be measured absolutely (e.g., width expressed in pixels or converted from pixels to nanometers) or relative to other tiles from the same digital pathology image, from a class of digital pathology images (e.g., produced using similar techniques or by a single digital pathology image generation system or scanner), or from a related family of digital pathology images. Furthermore, tiles can be classified prior to the tile embedding module 112 generating embeddings for the tiles such that the tile embedding module 112 considers the classification when preparing the embeddings.

For consistency, the tile embedding module 112 produces embeddings of a predefined size (e.g., vectors of 512 elements, vectors of 2048 bytes, etc.). The tile embedding module 112 can produce embeddings of various and arbitrary sizes. The tile embedding module 112 can adjust the sizes of the embeddings based on user direction or can be selected, for example, based on computation efficiency, accuracy, or other parameters. In particular embodiments, the embedding size can be based on the limitations or specifications of the deep learning neural network that generated the embeddings. Larger embedding sizes can be used to increase the amount of information captured in the embedding and improve the quality and accuracy of results, while smaller embedding sizes can be used to improve computational efficiency.

The digital pathology image processing system 110 can perform different inferences by apply one or more machine-learning models to the embeddings, i.e., inputting the embeddings to a machine-learning model. As an example, the digital pathology image processing system 110 can identify, based on a machine-learning model trained to identify layers of skin tissue samples, an epidermal layer of a skin tissue sample. In addition, the keratin and epidermal area may be segmented. In some embodiments, it may be not necessary to crop the image into image tiles, generate embeddings for these tiles, and then perform inferences based on such embeddings. Instead, the digital pathology image processing system 110 can directly apply the machine-learning model to the embedding of a whole slide image to make inference with sufficient GPU memory. The output of the machine-learning model may be resized into the shape of the input image.

A whole slide image access module 113 can manage requests to access whole slide images from other modules of the digital pathology image processing system 110 and the user device 130. For example, the whole slide image access module 113 receive requests to identify a whole slide image based on a particular tile, an identifier for the tile, or an identifier for the whole slide image. The whole slide image access module 113 can perform tasks of confirming that the whole slide image is available to the user requesting, identifying the appropriate databases from which to retrieve the requested whole slide image, and retrieving any additional metadata that may be of interest to the requesting user or module. Additionally, the whole slide image access module 113 can handle efficiently streaming the appropriate data to the requesting device. As described herein, whole slide images may be provided to user devices in chunks, based on the likelihood that a user will wish to see the portion of the whole slide image. The whole slide image access module 113 can determine which regions of the whole slide image to provide and determine how to provide them. Furthermore, the whole slide image access module 113 can be empowered within the digital pathology image processing system 110 to ensure that no individual component locks up or otherwise misuses a database or whole slide image to the detriment of other components or users.

An output generating module 114 of the digital pathology image processing system 110 can generate output corresponding to result tile and result whole slide image datasets based on user request. As described herein, the output can include a variety of visualizations, interactive graphics, and reports based upon the type of request and the type of data that is available. In many embodiments, the output will be provided to the user device 130 for display, but in certain embodiments the output can be accessed directly from the digital pathology image processing system 110. The output will be based on existence of and access to the appropriate data, so the output generating module will be empowered to access necessarily metadata and anonymized patient information as needed. As with the other modules of the digital pathology image processing system 110, the output generating module 114 can be updated and improved in a modular fashion, so that new output features can be provided to users without requiring significant downtime.

The general techniques described herein can be integrated into a variety of tools and use cases. For example, as described, a user (e.g., pathology or clinician) can access a user device 130 that is in communication with the digital pathology image processing system 110 and provide a query image for analysis. The digital pathology image processing system 110, or the connection to the digital pathology image processing system can be provided as a standalone software tool or package that searches for corresponding matches, identifies similar features, and generates appropriate output for the user upon request. As a standalone tool or plug-in that can be purchased or licensed on a streamlined basis, the tool can be used to augment the capabilities of a research or clinical lab. Additionally, the tool can be integrated into the services made available to the customer of digital pathology image generation systems. For example, the tool can be provided as a unified workflow, where a user who conducts or requests a whole slide image to be created automatically receives an report of noteworthy features within the image and/or similar whole slide images that have been previously indexed. Therefore, in addition to improving whole slide image analysis, the techniques can be integrated into existing systems to provide additional features not previously considered or possible.

Moreover, the digital pathology image processing system 110 can be trained and customized for use in particular settings. For example, the digital pathology image processing system 110 can be specifically trained for use in providing insights relating to specific types of tissue (e.g., lung, heart, blood, liver, etc.). As another example, the digital pathology image processing system 110 can be trained to assist with safety assessment, for example in determining levels or degrees of toxicity associated with drugs or other potential therapeutic treatments. Once trained for use in a specific subject matter or use case, the digital pathology image processing system 110 is not necessarily limited to that use case. Training may be performed in a particular context, e.g., toxicity assessment, due to a relatively larger set of at least partially labeled or annotated images.

FIG. 2 illustrates an example method 200 for determining skin toxicity of tissue samples. The method may begin at step 210, where a digital pathology image processing system 110 may receive a querying image associated with a tissue sample after a treatment by a drug compound. As an example, in the context of evaluating skin tissue, the tissue sample may comprise a reconstructed human epidermis (RHE) sample such as RHE sample 310 illustrated in FIG. 3B. At step 220, the digital pathology image processing system 110 may identify, based on a machine-learning model trained to identify layers of tissue samples, a target layer of the tissue sample. As an example, for the reconstructed human epidermis (RHE) sample 310, the identified target layer may comprise an epidermal layer 312. The digital pathology image processing system 110 may first perform image processing. For every RHE sample, both the two RHE tissue sections (i.e., keratin layer and viable epidermal layer) may be identified. Bounding boxes may be used to identify the tissue sections. In addition, the digital pathology image processing system 110 may use sliding windows to generate a mask over the layers. The digital pathology image processing system 110 may then crop the querying image into a plurality of image tiles using the tile generation module 111. The digital pathology image processing system 110 may then perform model inference by applying a machine-learning model to the cropped image tiles. The output of the machine-learning model may be resized into the shape of the input image, i.e., resizing an output of the machine-learning model into a shape of the querying image. As a result, RHE tissue areas may be inferred by the machine-learning model and the keratin and epidermal area may be segmented.

At step 230, the digital pathology image processing system 110 may calculate a normalized thickness of the identified target layer. In particular embodiments, the digital pathology image processing system 110 may measure the thickness at several locations of the identified target layer, up to and including every location. The digital pathology image processing system 110 may quantify the thickness at several locations, up to and including everything location. The digital pathology image processing system 110 may then provide the thickness endpoints to pathologists. In particular embodiments, the digital pathology image processing system 110 may operate in different ways to complete the measurement. As an example and not by way of limitation, the measurement by the digital pathology image processing system 110 may be fully automated and end-to-end. As another example and not by way of limitation, the measurement by the digital pathology image processing system 110 may be human-guided (e.g., a human may using the digital pathology image processing system 110 to select the locations to measure or draw the approximate measurements). As an example and not by way of limitation, the measurement by the digital pathology image processing system 110 may be human-assisting (e.g., the digital pathology image processing system may suggest measurements to pathologists).

At step 240, the digital pathology image processing system 110 may determine a toxicity indication of the treatment by the drug compound based on the normalized thickness of the identified target layer. In particular embodiments, the toxicity indication may indicate whether there is toxicity, i.e., adverse effect from the treatment by the drug compound. As an example and not by way of limitation, the toxicity indication may be a binary result, e.g., 0 indicating there is no toxicity and 1 indicating there is toxicity. As another example and not by way of limitation, the toxicity indication may be a score indicating the probability of toxicity, e.g., 0.75 indicating higher probability of toxicity than 0.2. As yet another example and not by way of limitation, the toxicity indication may be a degree of toxicity, e.g., 5 indicating a more severe toxicity than 1. In particular embodiments, determining the toxicity indication based on the normalized thickness of the identified target layer may be based on comparing the normalized thickness with a threshold value. For example, the normalized thickness being smaller than the threshold value may reveal a decrease in the thickness of the target layer, which may further indicate there is toxicity. As another example, the normalized thickness being the same as or larger than the threshold value may indicate there is no toxicity. Determining the toxicity indication based on the normalized thickness of the identified target layer may be also based on comparing the normalized thickness with the thickness of the target layer before the treatment by the drug compound. For example, the normalized thickness being smaller than the thickness of the target layer before the treatment by the drug compound may indicate there is toxicity. As another example, the normalized thickness being the same as or larger than the thickness of the target layer before the treatment by the drug compound may indicate there is no toxicity. Determining the toxicity indication based on the normalized thickness of the identified target layer may be also based on a percentage calculated by dividing the normalized thickness by the thickness of the target layer before the treatment by the drug compound. For example, the percentage being smaller than 10% may indicate very severe toxicity; the percentage being between 10% and 50% may indicate severe toxicity; the percentage being between 50% and 80% may indicate mild toxicity; and the percentage being larger than 90% may indicate rare or no toxicity. Determining the toxicity indication based on the normalized thickness of the identified target layer may be also based on another machine-learning model. For example, the normalized thickness may be input to this machine-learning model trained to output toxicity indication based on the input of normalized thickness. Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for determining skin toxicity of tissue samples, including the particular steps of the method of FIG. 2, this disclosure contemplates any suitable method for determining skin toxicity of tissue samples, including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3A:
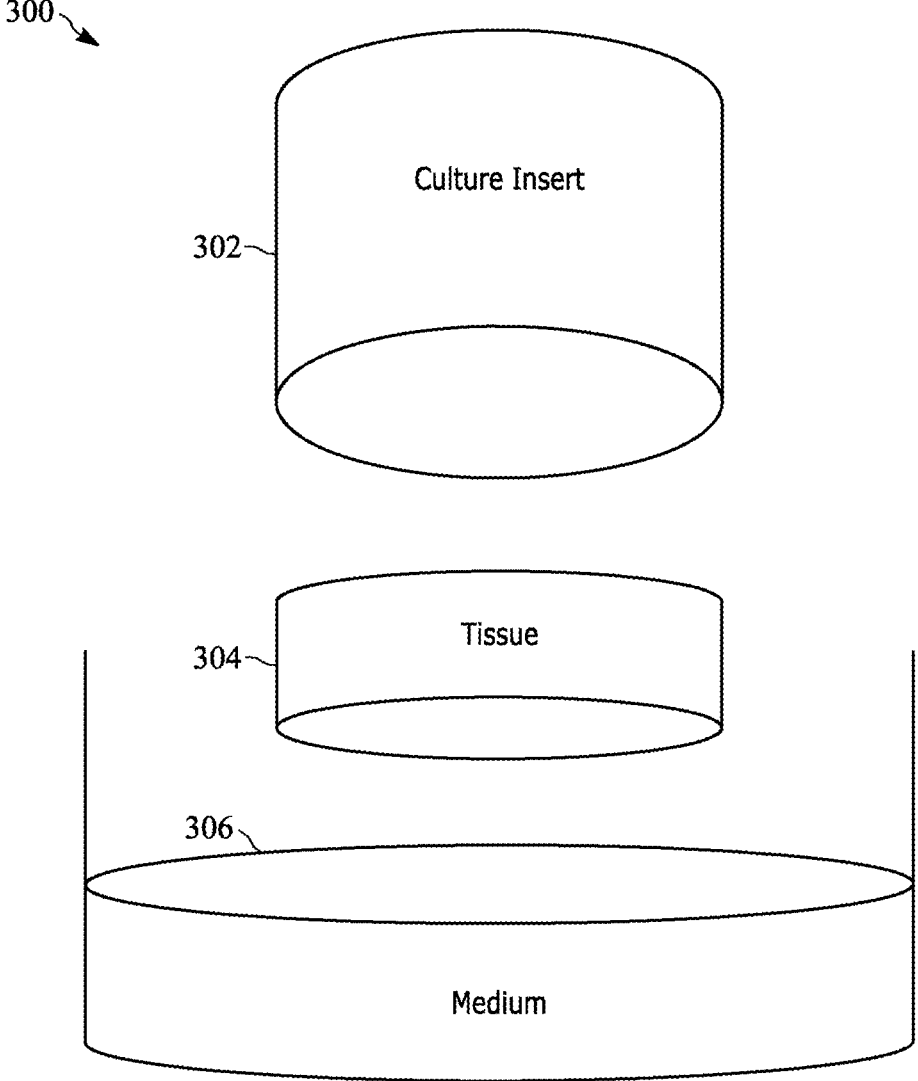
FIG. 3A illustrates an example reconstructed human epidermis (RHE) model.

A decrease in epidermal thickness of the skin may be a toxicity indication for skin toxicities as well as for cutaneous disease. For example, one can calculate a percentage by dividing the epidermal thickness of the skin after the treatment by a drug compound by the epidermal thickness before the treatment. If the percentage is smaller than 10%, it may indicate very severe toxicity; if the percentage is between 10% and 50%, it may indicate severe toxicity; if the percentage is between 50% and 80%, it may indicate mild toxicity; and if the percentage is larger than 90%, it may indicate rare or no toxicity. There are few preclinical methods for evaluating in vivo skin toxicity prior to clinical trial. The last two decades have seen the advent of in vitro human skin models, which have a proven record of accurately predicting clinical skin toxicity. FIG. 3A illustrates an example reconstructed human epidermis (RHE) model 300. These reconstituted human epidermal (RHE) models 300 may be metabolically and mitotically active 3D models of the normal human epidermis derived from cultured human epidermal keratinocytes. The RHE models 300 may have in vivo-like morphology and growth characteristics. In particular embodiments, using RHE models 300 may have reasonable predictive value for skin toxicity. The RHE models 300 may have keratinocytes only but no dermis, vasculature or immune/inflammatory cells. As illustrated in FIG. 3A, the RHE model 300 may comprise three parts, culture insert 302, tissue 304, and medium 306.

Figure 3B:
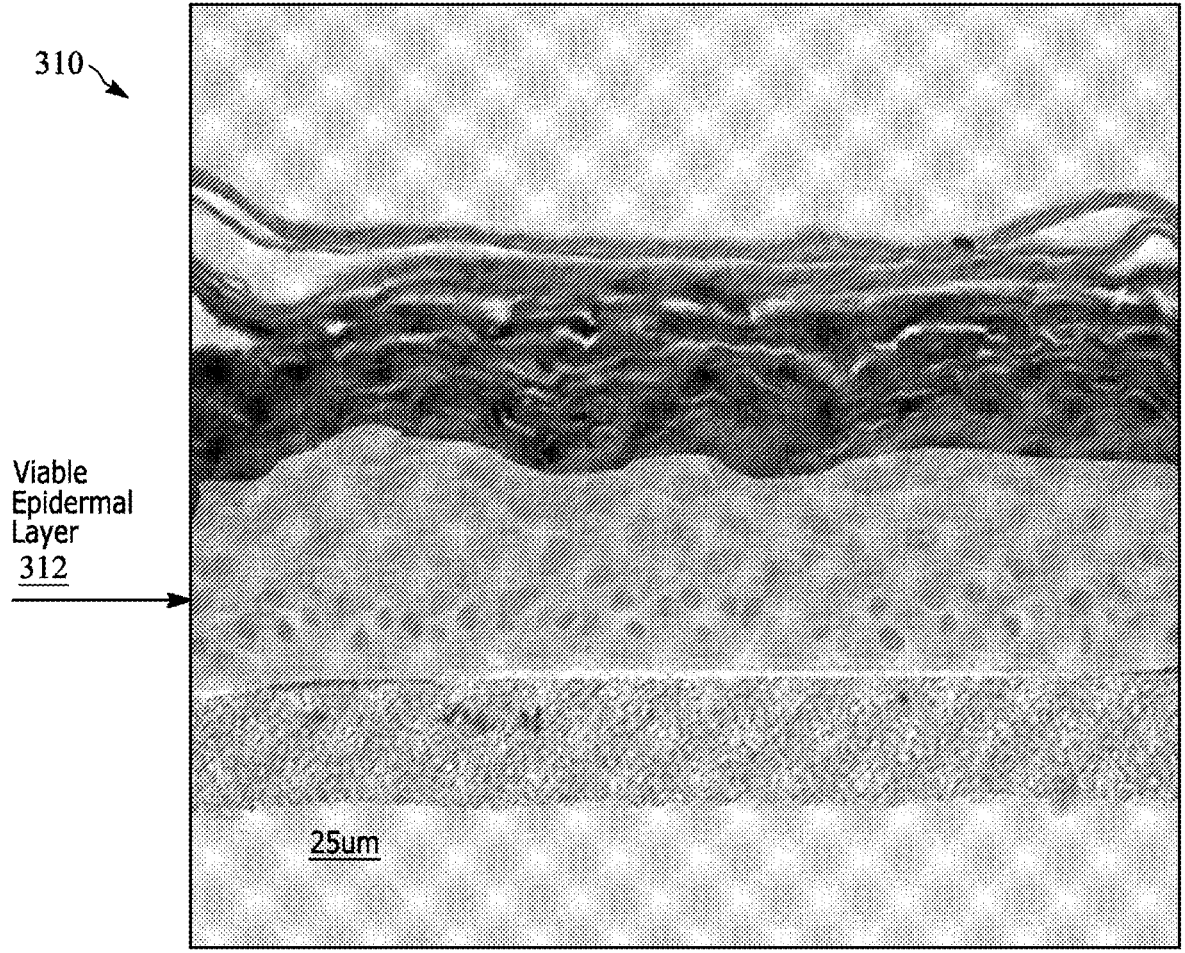
FIG. 3B illustrates an example image of a RHE sample.

FIG. 3B illustrates an example image of a RHE sample 310. As illustrated in FIG. 3B, the RHE sample 310 may comprise a viable epidermal layer 312. As thickness of the epidermal layer 312 may reflect potential toxicity, one may measure the epidermal thickness in the RHE sample 310 to support skin toxicity assessment of EGFR molecules. After culture with a drug of interest, pathologists may evaluate the RHE samples 310 for signs of skin toxicity and use a semi-quantitative method to identify changes in epidermal thickness. However, this method may be time-consuming and subjective, leading to longer drug development timelines and a hindered ability for cross-study comparisons of skin toxicity.

Besides evaluating skin toxicity based on RHE samples 310, the embodiments disclosed herein may have a variety of applications. As an example and not by way of limitation, the retina is composed of multiple layers and the embodiments disclosed herein may be used to evaluate changes in retinal thickness. As another example and not by way of limitation, the embodiments disclosed herein may be used in a diagnostic setting (e.g., using a biopsy sample) or to evaluate potential treatments and/or adverse reactions of patients to drugs that may be prescribed. In addition, the embodiments disclosed herein may be used outside of the lab and/or safety assessment environment. As an example and not by way of limitation, the assessment of layers of tissues samples may be used as part of a suite of available analytical techniques to apply to digital pathology images. In the embodiments as disclosed herein, particular examples will be described relating to the evaluation of skin tissues, and particularly the evaluation of epidermal thickness as it relates to indication of toxicity, but that similarly techniques may be applied to evaluation of any other suitable indications in skin tissues, evaluation of any other suitable layers of skin tissues, and/or evaluation of any other suitable types of tissues given the availability of sufficient training samples.

To address the issues of manual evaluation of RHE samples 310 for skin toxicity, the embodiments disclosed herein use deep learning to identify the viable epidermis of the RHE samples 310 and assist pathologists with quantitative endpoints. Using the embodiments disclosed herein, five skin toxicity studies evaluating drug compounds in clinical development were performed. The RHE samples 310 were first analyzed and then quantitative epidermal thickness endpoints were extracted. Four studies with manual pathologist evaluations were used to assess algorithm extracted epidermal thickness. The extracted measurement based on the machine-learning model also was compared to two studies with manual pathologist measurements. Finally, RHE samples 310, each treated with compounds, with either known or suspected skin toxicity were used to evaluate the utility of the embodiments disclosed herein in identifying compounds at high risk for skin toxicity. Based on the success of the model in comparison to pathologist evaluation, an accurate, transferrable model for evaluating tissue sample segment thickness in relation to particular clinical outcomes and indications has been developed.

Figure 3C:
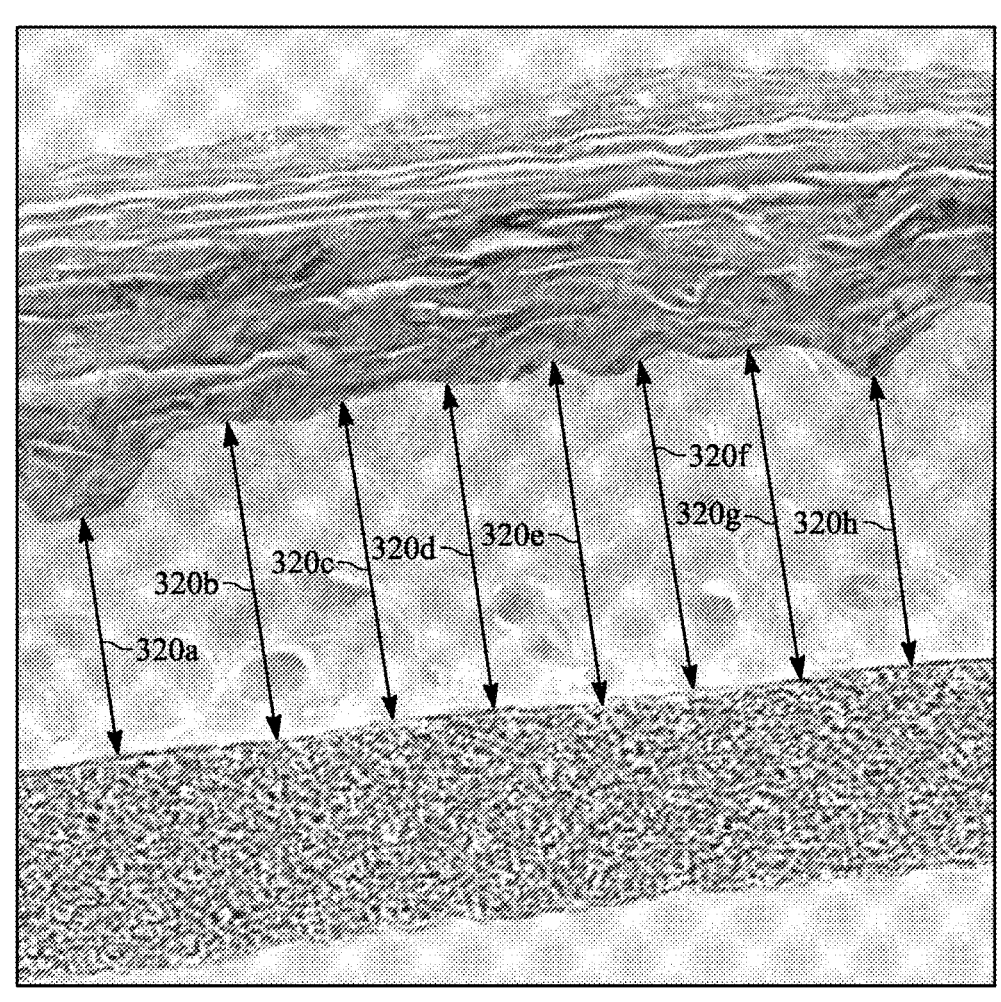
FIG. 3C illustrates example measurement locations for measurement of a tissue sample segment.

FIG. 3C illustrates example locations for measurement of a tissue sample segment. As an example, in the context of evaluating skin tissue, the tissue sample may comprise a reconstructed human epidermis (RHE) sample 310 and the identified target layer may comprise an epidermal layer 312. In particular embodiments, the digital pathology image processing system 110 may measure the thickness at several locations, e.g., location 320*a*, location 320*b*, location 320*c*, location 320*d*, location 320*e*, location 320*f*, location 320*g*, and location 320*h*. As an example, the digital pathology image processing system 110 may measure the thickness at every predetermined or viable location. The aforementioned measurements may be part of step 230 illustrated in FIG. 2.

In particular embodiments, the machine-learning model may be trained based on a plurality of training images. Each training image may be associated with a RHE sample. In particular embodiments, each training image may comprise a plurality of image tiles. Each of the plurality of image tiles may comprise a plurality of pixels. Each of the plurality of pixels may be associated with an annotation indicting whether the corresponding pixel belongs to a first layer or a second layer (e.g., the target layer). As an example, in the context of evaluating skin tissue, the first layer may be a keratin layer and the second layer may be an epidermal layer. In other words, to train the machine-learning model, pixel-level annotations of the various layers from a plurality of samples may be needed, such as multiple annotations of the keratin layer and the viable epidermal layer 312 from a plurality of RHE samples 310. In particular embodiments, during training, a variety of data augmentations may be applied to the training images. As an example and not by way of limitation, such data augmentations may comprise one or more of adding noise, changing hue, changing contrast, or elastic transformation.

Figure 4A:
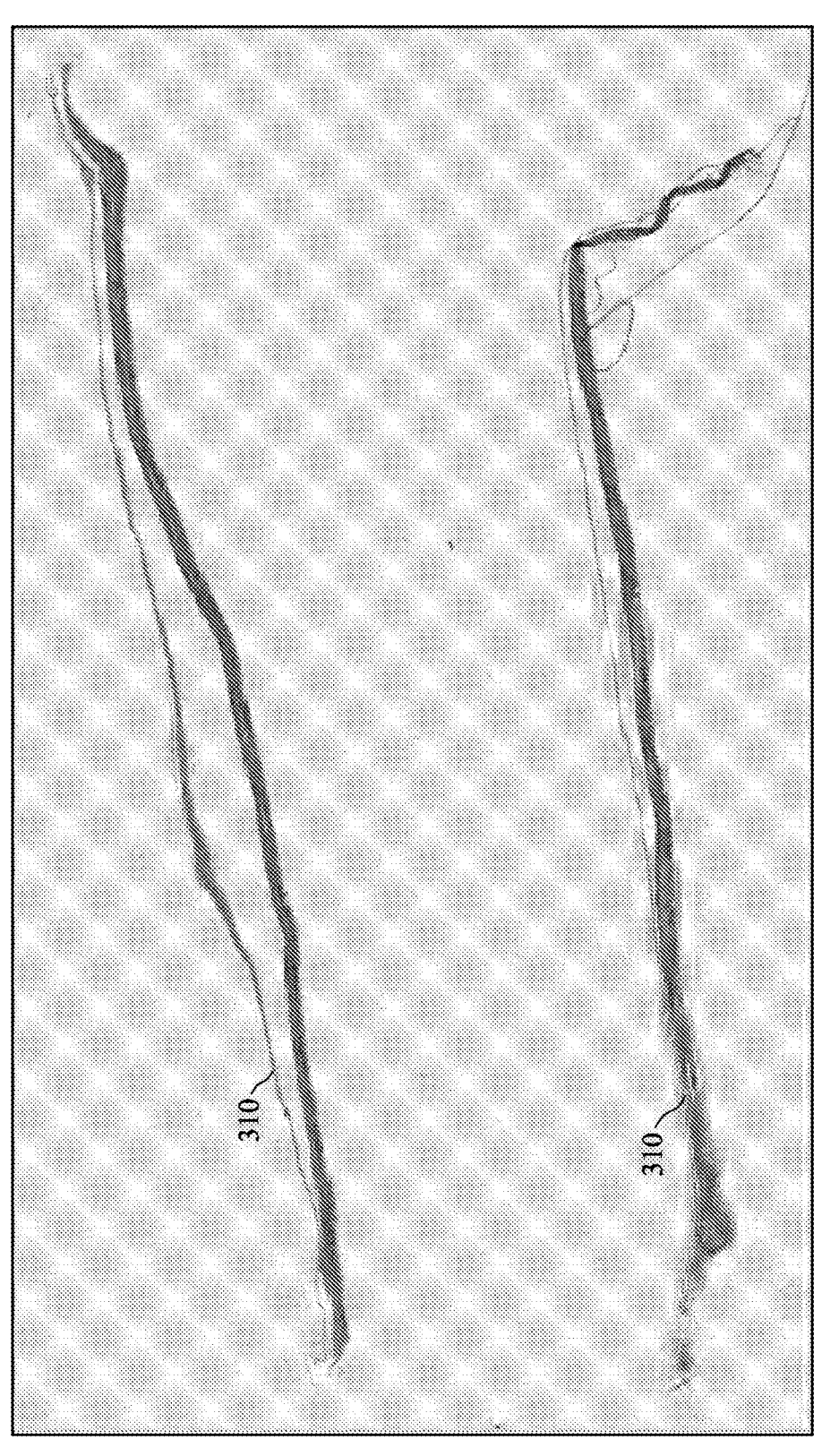
FIG. 4A illustrates example RHE samples for training a machine-learning model.

The annotations may be created by a pathologist. As an example and not by way of limitation, nine RHE samples 310 may be used and image tiles with a width and height of 1024 pixels and the corresponding pixel-level annotations of these RHE samples 310 may be extracted at 40× resolution for training the machine-learning model. As another example and not by way of limitation, four RHE samples 310 may be used and image tiles with a width and height of 128, 256, or 512 pixels and the corresponding pixel-level annotations of these RHE samples 310 may be extracted at 2×, 5×, 10×, 20×, or 60× resolution for training the machine-learning model. Although this disclosure describes particular numbers of RHE samples used with image tiles with particular width and height and the corresponding pixel-level annotations being extracted at particular resolution in a particular manner, this disclosure contemplates any suitable number of RHE samples used with image tiles with any suitable width and height and the corresponding pixel-level annotations being extracted at any suitable resolution in any suitable manner. FIG. 4A illustrates example RHE samples 310 for training the machine-learning model. FIG. 4B illustrates example annotations of the RHE samples 310 with an example tile. As illustrated in FIG. 4B illustrates the annotated epidermal layer 312 in each of the two RHE samples 310. In addition, the image tile 410 may be a tile extracted with a width and height of 1024 pixels.

In particular embodiments, the machine-learning model may be based on one or more different deep-learning architectures. Specifically, the machine-learning model may be based on a deep learning algorithm. The architecture of the deep learning algorithm may be based on one or more of a U-net, a Resnet U-net, or a deep residual neural network. As an example and not by way of limitation, a variation of the U-Net, Resnet U-net, may be used for training the machine-learning model. Resnet U-net may be trained using Keras or Tensorflow. The encoder of the U-Net may be replaced with deep residual neural network (e.g., 50-layer version) and the rest of the U-Net architecture may remain the same. In particular embodiments, model training may be performed with a step size of 512 for 90 epochs with a batch size of 8 using GPUs. Data augmentation techniques including random rotation, cropping, scaling, shifting, adding noises and varying color contrast may be also applied during the training process. In particular embodiments, focal loss and Adam optimizer (e.g., with learning rate of $1 \times 10^{-3}$) may be used for optimization. Due to the time-consuming nature of the annotation process, instead of splitting out annotated data into validation and test sets, up to all of the annotated data may be used for training.

Figure 5A:
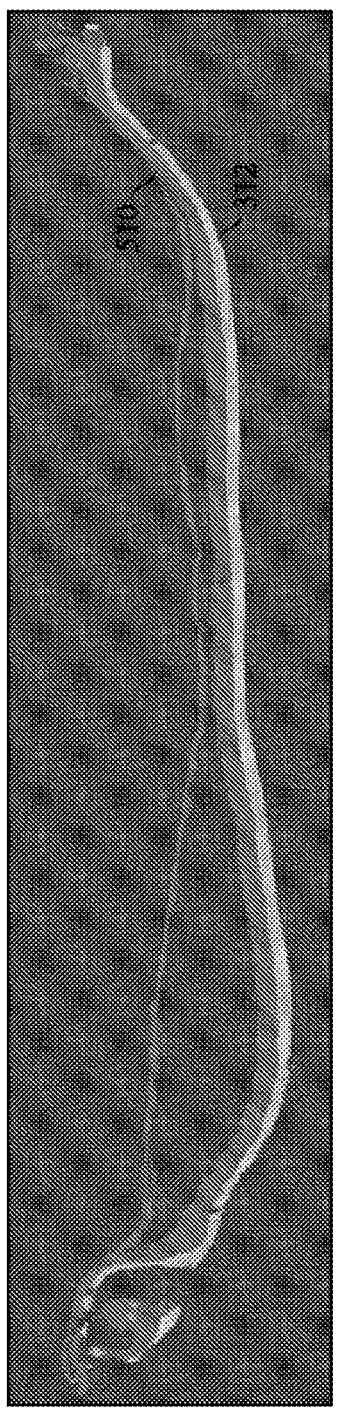
FIG. 5A illustrates an example annotation of an RHE sample with tissue sections.
Figure 5B:
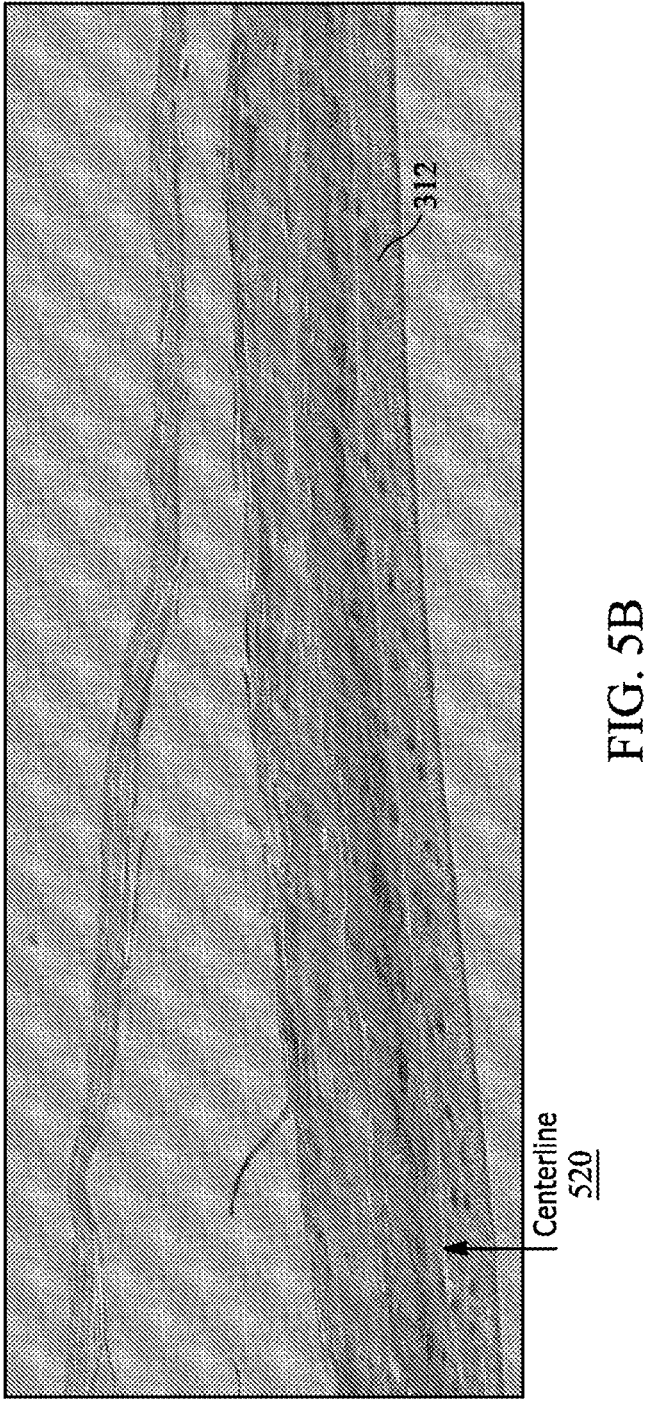
FIG. 5B illustrates an example extraction of thickness of a tissue sample.

FIGS. 5A-5C illustrate example steps for quantifying epidermal layer thickness. In particular embodiments, once the machine-learning model is trained, the digital pathology image processing system 110 may use it to identify the target layer (e.g., the epidermal layer 312 of the RHE sample 310), which may be step 220 illustrated in FIG. 2. In the context of evaluation skin tissue, the digital pathology image processing system 110 may receive a querying image associated with a reconstructed human epidermis (RHE) sample 310 after a treatment by a drug compound, which may be step 210 illustrated in FIG. 2. The digital pathology image processing system 110 may first perform image processing, which may be part of step 220 in FIG. 2. In particular embodiments, for every RHE sample 310, both the two RHE tissue sections (i.e., keratin layer and viable epidermal layer 312) may be identified. In particular embodiments, bounding boxes may be used to identify the tissue sections. In addition, the digital pathology image processing system 110 may use sliding windows to generate a mask over the layers. Besides for identifying the tissue sections, the mask may be also used for measuring thickness, determining areas of the layer, determining lengths for different endpoints, and determining curviness for tortuosity, and measuring volume in a three-dimensional scenario. In particular embodiments, the digital pathology image processing system 110 may crop the querying image into a plurality of image tiles, which may be part of step 220 in FIG. 2. As an example and not by way of limitation, for each RHE tissue section, the identified tissue area may be cropped into image tiles with width and height of 1024 pixels. In particular embodiments, the width and height of pixels may be dynamically determined (i.e., not fixed) based on factors such as the evaluation task, the querying image itself, or any suitable factor. Although this disclosure describes generating image tiles with width and height of particular pixels in a particular manner, this disclosure contemplates generating any suitable image tile with width and height of any suitable pixel in any suitable manner. The digital pathology image processing system 110 may then perform model inference by applying the trained machine-learning model to the cropped image tiles, i.e., inputting the plurality of image tiles to the machine-learning model, which may be part of step 220 in FIG. 2. In other words, the digital pathology image processing system 110 may identify, based on a machine-learning model trained to identify layers of RHE samples, an epidermal layer 312 of the RHE sample 310. The inference may be performed using GPUs. In particular embodiments, it may be not necessary to crop the image into image tiles. Instead, the digital pathology image processing system 110 may directly apply the machine-learning model to the querying image to make inference with sufficient GPU memory. The output of the machine-learning model may be resized into the shape of the input image, i.e., resizing an output of the machine-learning model into a shape of the querying image. RHE tissue areas may be inferred by the machine-learning model and the keratin and epidermal area 312 may be segmented. In particular embodiments, any suitable image processing techniques may be used. As an example and not by way of limitation, such techniques may comprise adjusting the colors of the samples according to the stain used. In particular embodiments, the segmentations may be examined by pathologists to ensure both keratin and epidermal area were captured.

FIG. 5A illustrates an example annotation of an RHE sample 310 with tissue sections. As indicated in FIG. 5A, the tissue sections may comprise the keratin layer 510 and the epidermal layer 312. After the epidermal area is identified, the thickness of the viable epidermal area may be computed, e.g., based on distance transformation. In particular embodiments, the median thickness value may be used to represent the thickness of the viable epidermal area for each tissue section and the average thickness of the two tissue sections of a RHE sample 310 may be used to represent a single RHE sample 310. FIG. 5B illustrates an example extraction of thickness of a tissue sample. As indicated in FIG. 5B, the digital pathology image processing system 110 may first determine a centerline 520 for the identified target layer (e.g., epidermal layer 312) and then calculate its thickness based on the centerline 520. The digital pathology image processing system 110 may identify a plurality of locations associated with the identified target layer (e.g., epidermal layer 312). The digital pathology image processing system 110 may then quantify, based on the centerline, a thickness value for each of the plurality of locations. The digital pathology image processing system 110 may further determine, an average thickness value for the identified target layer (e.g., epidermal layer 312) based on the plurality of thickness values for the plurality of locations. In particular embodiments, the digital pathology image processing system 110 may divide the average thickness value of the identified target layer (e.g., epidermal layer 312) by an average thickness value of tissue samples (e.g., RHE samples 310) from a control group. This way, the thickness of each tissue sample (e.g., RHE sample 310) may be normalized. FIG. 5C illustrates an example normalization of the tissue thickness. As illustrated in FIG. 5C, there may be on control group comprising four samples, a group A comprising four samples, and a group B comprising four samples. The left subfigure of FIG. 5C may show the originally measured thickness whereas the right subfigure of FIG. 5C may show the normalized thickness. Although this disclosure describes calculating normalized thickness in a particular manner, this disclosure contemplates calculating normalized thickness in any suitable manner. As an example and not by way of limitation, the digital pathology image processing system may determine a plurality of step-wise thickness measurements along an axis determined based on the epidermal layer, calculate a length and area of the epidermal layer with the thickness being derived from them, and then calculate the normalized thickness accordingly.

The embodiments disclosed herein further conduct a retrospective study based on RHE samples 310 from five studies that evaluated the skin toxicity of various compounds. Table 1 summarizes the five studies and the endpoints available for each study. The 3D in vitro human skin model was used for all studies. A total of 31 compounds with known or suspected clinical skin toxicity were evaluated for skin toxicity, some of which were evaluated in more than one study. Upon receipt of the RHE samples 310, each tissue culture insert was transferred to a well of 6-well plate containing 1 mL/well of pre-warmed maintenance media and kept dry on top to maintain an air-liquid interface. The RHE samples 310 were equilibrated at 37° C., 5% $CO_2$ overnight, and fed with fresh media the next day. One day later, the RHE samples 310 were subjected to 4-day daily basolateral treatment with test articles at various concentrations, or vehicle control DMSO at 0.5%. Table 2 lists each compound, the study, and the different concentrations at which it was evaluated. Upon completion of treatment, the RHE samples 310 were harvested, fixed, processed to slides, and routinely stained with hematoxylin and eosin. Internal test compounds with suspected skin toxicity were anonymized.

TABLE 1

| Summary of the study sample size and annotation. | | | | | |
|---|---|---|---|---|---|
| Study | Number of compound | Number of samples | Number of control samples | Number of slide with pixel level annotation | Pathologist score? | Manually measured thickness? |
| 1 | 16 | 96 | 6 | 1 | Yes (A) | No |
| 2 | 7 | 49 | 4 | 0 | Yes (B) | No |
| 3 | 7 | 56 | 4 | 4 | No | No |
| 4 | 6 | 64 | 4 | 3 | Yes (C) | Yes (C) |
| 5 | 3 | 16 | 4 | 1 | Yes (C) | Yes (C) |

TABLE 2

| Summary of compounds, dose and sample size. | | |
|---|---|---|
| Study | Compounds | Dose (number of samples) |
| 1 | G-0001 | 0.5 µM, 5 µM (3, 3) |
| | G-0002 | 0.5 µM, 5 µM (3, 3) |
| | Cetuximab | 50 µg/ml (3) |
| | G-0003 | 0.5 µM, 5 µM (3, 3) |
| | G-0004 | 0.5 µM, 5 µM (3, 3) |
| | Erlotinib | 2 µM (3) |
| | XL281 | 0.5 µM, 5 µM (3, 3) |
| | G-0005 | 2 µM, 10 µM (3, 3) |
| | Imatinib | 2 µM, 10 µM (3, 3) |
| | Jnj-38877605 | 2 µM, 10 µM (3, 3) |
| | Pf-04217903 | 2 µM, 10 µM (3, 3) |
| | G-0006 | 0.5 µM, 5 µM (3, 3) |
| | G-0007 | 0.5 µM, 5 µM (3, 3) |
| | Ruxolitinib | 2 µM, 10 µM (3, 3) |
| | Sorafenib | 0.5 µM, 5 µM (3, 3) |
| | Tofacitinib | 2 µM, 10 µM (3, 3) |
| | DMSO (control) | NA (6) |
| 2 | Alpelisib | 320 nM, 3200 nM (4, 4) |
| | Erlotinib | 10 µM (3) |
| | G-0008 | 39 nM, 390 nM (4, 4) |
| | Idelalisib | 80 nM, 800 nM (4, 4) |
| | Imatinib | 10 nM (3) |
| | Palbociclib | 23 nM, 230 nM (4, 3) |
| | Pictilisib | 1 µM (3) |
| | DMSO (control) | NA (4) |
| 3 | G-0009 | 1 µM, 10 µM (4, 4) |
| | G-0010 | 1 µM, 10 µM (4, 4) |
| | G-0011 | 1 µM, 10 µM (4, 4) |
| | G-0012 | 1 µM, 10 µM (4, 4) |
| | Cobimetinib | 0.02 µM, 1 µM (4, 4) |
| | Erlotinib | 10 µM (4) |
| | Pictilisib | 0.02 µM, 1 µM (4, 4) |
| | DMSO (control) | NA (4) |
| 4 | Afatinib | 1 µM, 10 µM (4, 4) |
| | G-0013 | 1 µM, 10 µM (4, 4) |
| | Erlotinib | 1 µM, 10 µM (8, 8) |
| | Lapatinib | 1 µM, 10 µM (4, 4) |
| | Osimertinib | 1 µM, 10 µM (4, 4) |
| | Poziotinib | 1 µM, 10 µM (4, 4) |
| | DMSO (control) | NA (8) |
| 5 | Osimertinib | 300 nM, 3000 nM (4, 4) |
| | Poziotinib | 300 nM (4) |
| | DMSO (control) | NA (4) |

Figure 6:
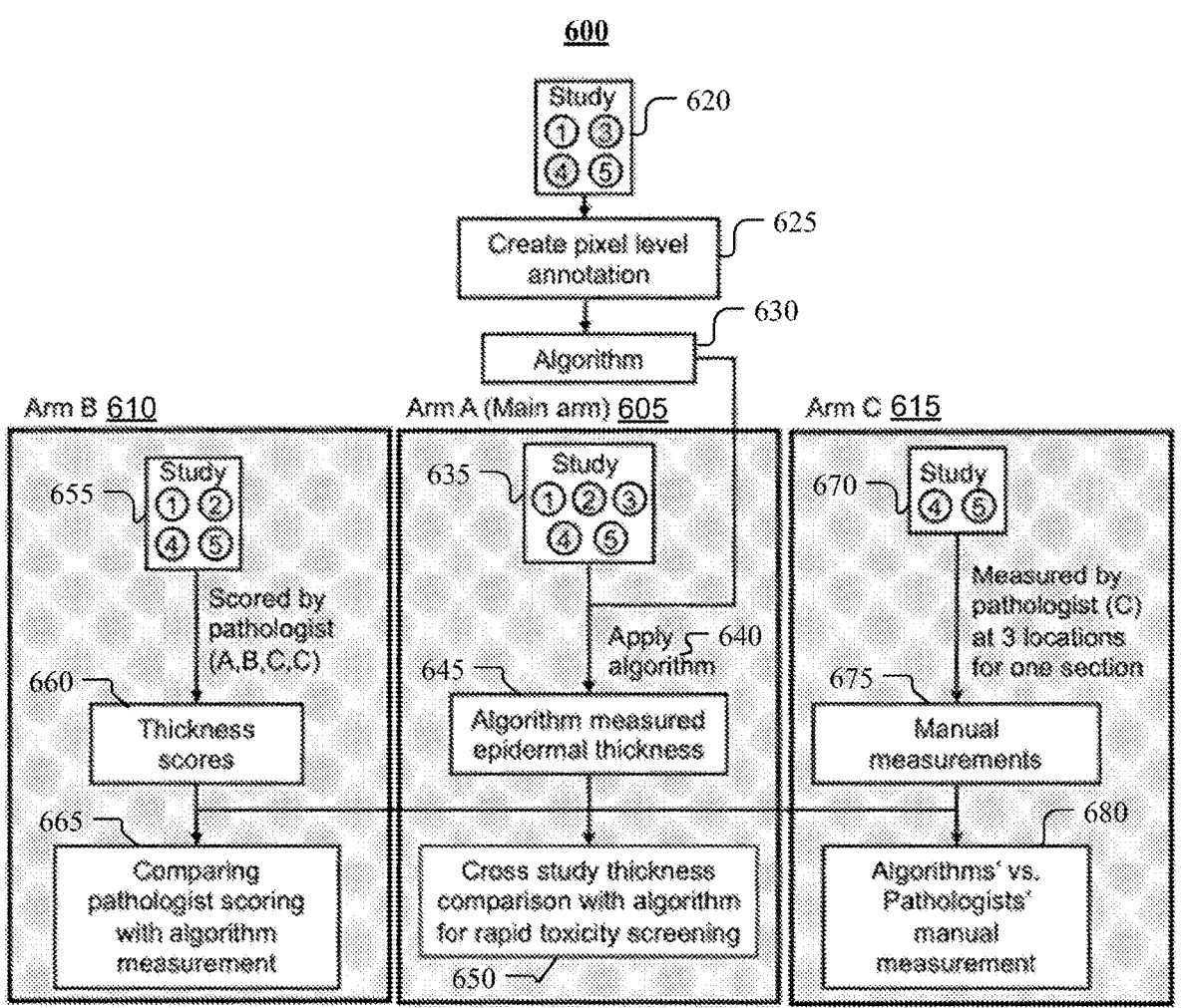
FIG. 6 illustrates an example workflow of the design of a retrospective study.

FIG. 6 illustrates an example workflow 600 of the design of a retrospective study. As illustrated in FIG. 6, the retrospective study may be based on three arms, i.e., arm A 605, arm B 610, and arm C 615. The workflow 600 may begin with pixel-level annotations of keratin and viable epidermal layers 312 of RHE samples 310. As an example and not by way of limitation, there may be nine RHE samples 310 from four of the skin toxicity studies 620 (i.e., study 1, study 3, study 4, and study 5) being annotated at the step of creating pixel-level annotation 625. The machine-learning model based on deep learning (e.g., the algorithm 630 as indicated in FIG. 6) may be trained from these samples to segment both the keratin and viable epidermal layers 312. Then the trained machine-learning model may be used to segment the viable epidermal area. Next, the segmented viable epidermal area by the machine-learning model may be processed to compute the thickness. In arm A 605, the segmented viable epidermal layers 312 from the studies 635 (i.e., studies 1-5) may be quantified with an image processing algorithm 640. In addition, the computed viable epidermal thickness 645 of the samples for each compound from the studies was compared to enable rapid toxicity screening with respect to arm A at step 650. Arm B 610 and arm C 615 were used to understand the relationship between the manual endpoints and the measured thickness based on the machine-learning model. In arm B 610, the viable epidermal thicknesses of the RHE samples 310 in four studies 655 (i.e., studies 1, 2, 4, and 5) were scored by pathologists A, B, C and C, respectively. Study 3 was not scored by pathologists. The thickness scores 660 were compared with the corresponding algorithm measurement of the thickness (i.e., based on the machine-learning model) at step 665. In arm C 615, pathologist C was provided an image viewing software to measure the viable epidermal thickness for two studies 670 (i.e. studies 4-5). The pathologist measured epidermal thickness 675 was compared with the algorithm measured (i.e., based on the machine-learning model) thickness at step 680.

RHE samples 310 in studies 1, 2, 4 and 5 were evaluated with optical microscopes by pathologists. The thickness of the viable epidermal area of the RHE samples 310 in studies 1, 2, 4 and 5 were scored by pathologists A, B, C and C, respectively. Each pathologist used a different scoring system to evaluate the thickness of the viable epidermal area. Pathologist A used the following system: marked epidermal thinning, moderate epidermal thinning, slight epidermal thinning, possible minimal decrease, no significant finding (same as control group), and possible increase in epidermal thickness. Pathologist B used a scoring scale of 2 to 8 with the following ranges: 2 to 3 (thinnest), 3 to 4, 4 to 5, 6 to 7 and 7 to 8 (same as the control group). Pathologist C used a scale of 0-4 where 0 was the same as the control group increasing to 4 which is the thinnest sample. To enable cross-study comparison, the scores from pathologists were normalized. The scores for the control group were set to 1 and then re-adjusted so the higher the score, the thinner the viable epidermal thickness. Table 3 summarizes the mapping from pathologist scores to the normalized scores.

TABLE 3

| Mapping of pathologist score to normalized score. | | |
|---|---|---|
| Pathologist | Pathologist score | Normalized score |
| A | Possible increase in epidermal thickness | 0 |
| | No significant finding | 1* |
| | Possible minimal decrease in epidermal thickness | 2 |
| | Slight epidermal thinning | 3 |
| | Moderate epidermal thinning | 4 |
| | Marked epidermal thinning | 5 |

TABLE 3-continued

| Mapping of pathologist score to normalized score. | | |
|---|---|---|
| Pathologist | Pathologist score | Normalized score |
| B | 7 to 8 | 1* |
| | 6 to 7 | 2 |
| | 5 to 6 | 3 |
| | 4 to 5 | 4 |
| | 3 to 4 | 5 |
| | 2 to 3 | 6 |
| C | 0 | 1* |
| | 0.5 | 1.5 |
| | 1 | 2 |
| | 1.5 | 2.5 |
| | 2 | 3 |
| | 3 | 4 |
| | 4 | 5 |

*Score for samples with no significant finding.

Figure 7:
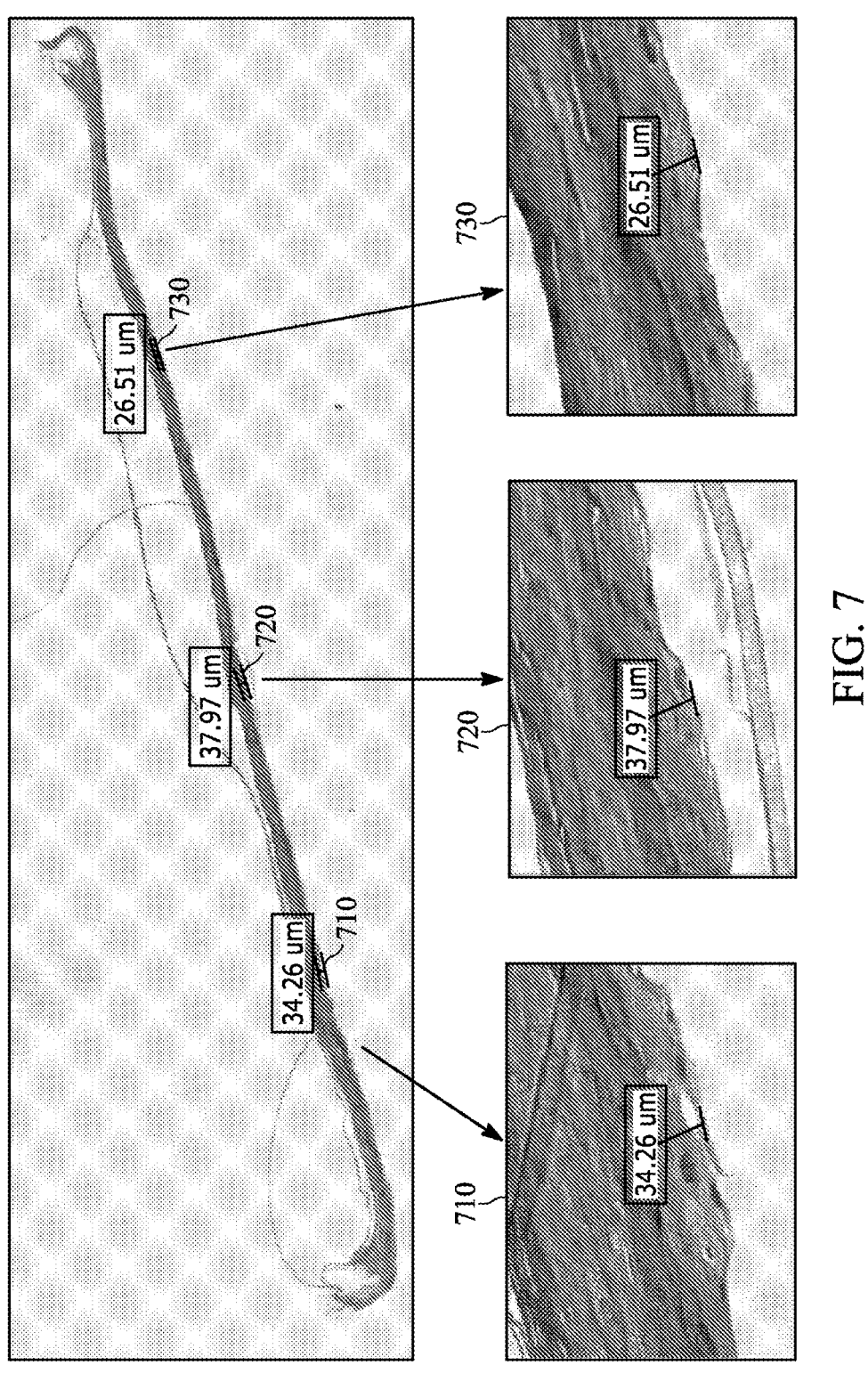
FIG. 7 illustrates example representative images from a pathologist measuring the viable epidermal thickness using an image viewer.

In addition to the manual scoring, the viable epidermal thickness of each sample in studies 4 and 5 was measured by pathologist C using an image viewing software. FIG. 7 illustrates example representative images from a pathologist measuring the viable epidermal thickness using an image viewer. As illustrated in FIG. 7, pathologist C chose three representative regions, i.e., region 710, region 720, and region 730, from each sample and measured the thickness of the RHE tissue, which resulted in three measured epidermal thickness endpoints per sample. As an example and not by way of limitation, the measured thickness for these three regions may be 34.26 um, 37.97 um, and 26.51 um, respectively. These three measurements were compared with the measurements determined based on the machine-learning model. These manual measurements were also served to validate the thickness measurement based on the machine-learning model, providing pathologist insights of how close the measured thickness based on the machine-learning model and the manual measured thickness are. To aid in the interpretation of any meaningful change in epidermal thickness, the presence of specific microscopic characteristics was assessed. The evaluation was performed by the three pathologists and included a qualitative assessment of the stratum corneum and stratum *granulosum*, presence of parakeratosis, single or widespread keratinocyte necrosis, and evidence of keratinocyte swelling, usually due to vacuolation.

The embodiments disclosed herein additionally performed statistical analyses for the retrospective study. Image analyses and statistical analyses may be performed with different software tools such as Python. To evaluate the relationship between the pathologist scores and the measured thickness based on the machine-learning model, Kendall's Tau-b correlation coefficients were computed. The correlations were computed between the normalized pathologist scores and the normalized averaged thickness measured based on the machine-learning model for studies 1, 2, 4, and 5.

The quantitative thickness measurements in studies 4-5 from the machine-learning model and pathologist C were also compared. The difference between the two measurements was expected to decrease as more manual measurements were made since the machine-learning model measured the thickness from the entire RHE sample 310, whereas the manual measurements were only made at three regions of interest (ROI). Therefore, a single thickness measurement was first randomly selected from the three measurements made from the pathologists. The randomly selected measurement for each sample was compared to the average measurement by the machine-learning model for that sample. Next, for each sample, the average of the three measurements from pathologist C were compared with the average measurement by the machine-learning model. The agreement between the model-measured epidermal thickness and the manually measured thickness by pathologist C in studies 4-5 was assessed, e.g., by using the Bland-Altman method.

To compare the rank orders across studies, the rank orders of the control samples were set to 1. In addition, the rank order increased to a maximum of 5 with a decrease in viable epidermal thickness. Zero or negative rank orders may suggest an increase in viable epidermal thickness. The embodiments disclosed herein refer to the converted rank order as the normalized pathologist score for simplicity.

The mean thickness of the normalized viable epidermal thickness from each study was grouped together and compared with the normalized viable epidermal thickness for each test compound. The same test compound and the same experimental protocol from different studies were combined. Additionally, a conventional method for multiple comparison was used.

Figure 8:
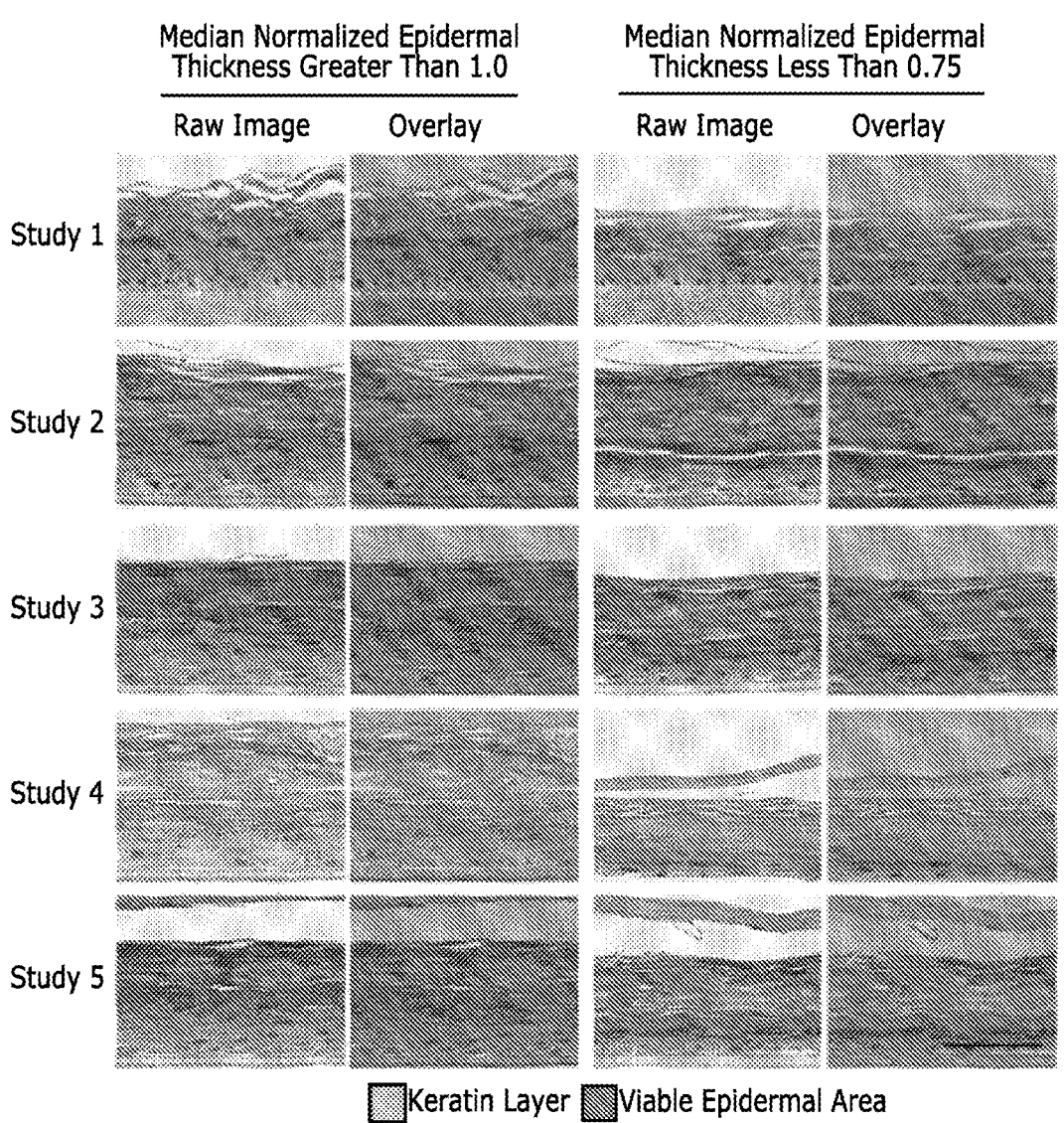
FIG. 8 illustrates example segmentations of viable epidermal area by the machine-learning model.

Based on the retrospective study, the embodiments disclosed herein found that viable epidermal thickness measured based on the machine-learning model significantly correlates with pathologist scores. The correlation may be discovered as follows. To begin with, the machine-learning model may segment the viable epidermal area for the samples from each study. FIG. 8 illustrates example segmentations of viable epidermal area by the machine-learning model. As illustrated in FIG. 8, the trained machine-learning model can segment the viable epidermal area. The viable epidermal area and the keratin layer were accurately identified when the normalized epidermal thickness is greater than 1.0 or less than 0.75.

Figures 9A, 9B, 9C, 9D:
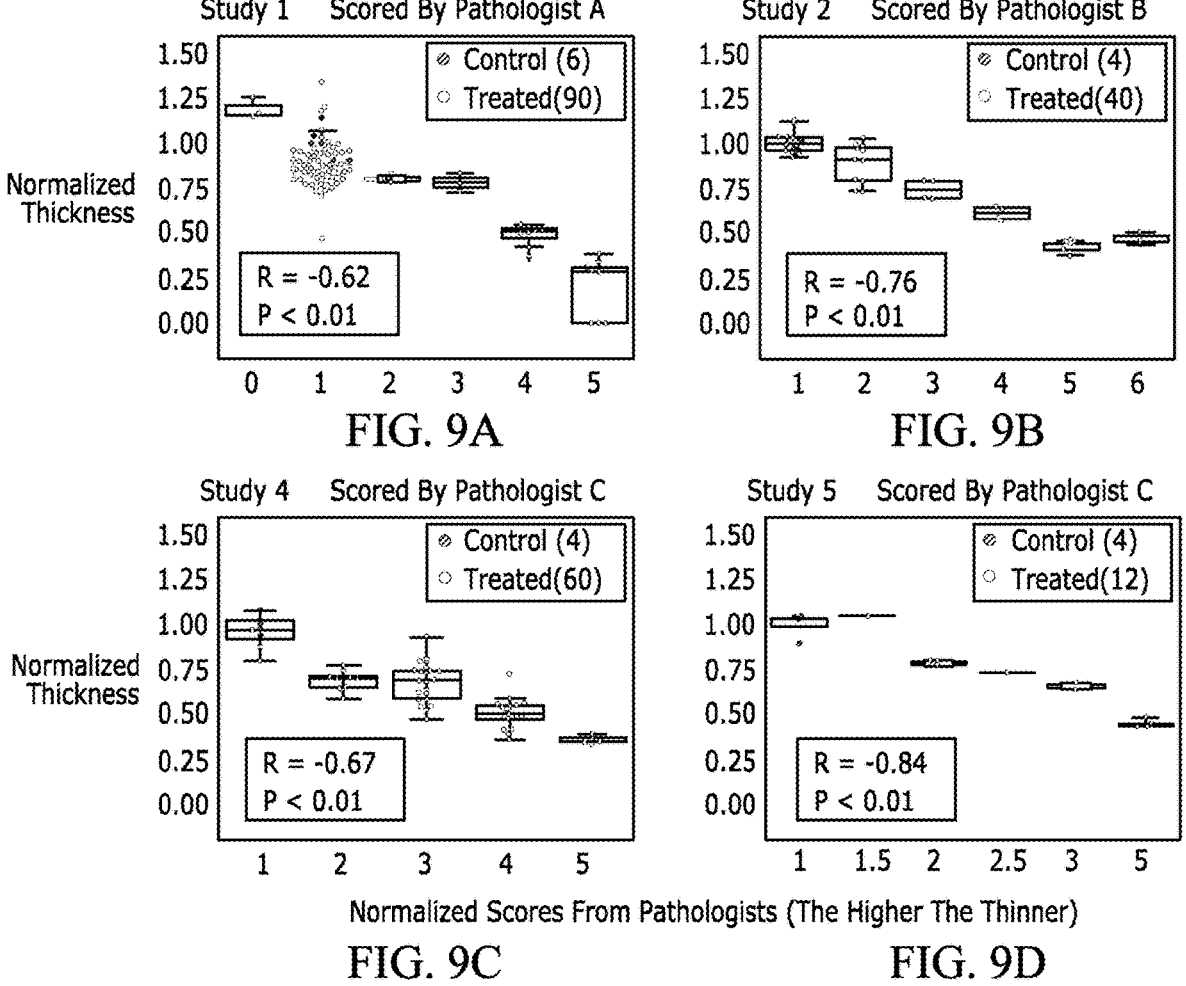
FIGS. 9A-9D illustrate example boxplots between normalized epidermal thickness measured based on the machine-learning model and normalized scores from a pathologist.

FIGS. 9A-9D illustrate example boxplots between normalized epidermal thickness measured based on the machine-learning model and normalized scores from a pathologist. FIG. 9A illustrates example boxplots between normalized epidermal thickness measured based on the machine-learning model and normalized scores from pathologist A for study 1. FIG. 9B illustrates example boxplots between normalized epidermal thickness measured based on the machine-learning model and normalized scores from pathologist B for study 2. FIG. 9C illustrates example boxplots between normalized epidermal thickness measured based on the machine-learning model and normalized scores from pathologist C for study 4. FIG. 9D illustrates example boxplots between normalized epidermal thickness measured based on the machine-learning model and normalized scores from pathologist C for study 5. The pathologist scores of the control group were set to 1 and the scores were adjusted so the higher the scores, the thinner the viable epidermal thickness. The algorithm measured epidermal thickness was normalized to the average thickness of the control group in each study. Kendall's Tau-b correlation coefficients were computed. Significant correlations ($R=-0.62$ for Study 1, $-0.76$ for 2, $-0.67$ for 4, and $-0.84$ for 5, $p<0.01$ for all) were observed between viable epidermal thickness measured based on the machine-learning model and the scores from pathologists. Notably, three samples in Study 1 dosed at 10 times the clinically relevant concentration were diagnosed with full thickness epidermal necrosis. The measured thickness for these three samples was zero (FIG. 9A). Additionally, in study 4, due to microscopic finding of keratinocyte vacuolar degeneration with associated cell swelling in seven samples, the manual decrease in thickness score was lower than expected, which was reflected in the score calculated based on the machine-learning model.

Figures 10A, 10B, 10C, 10D:
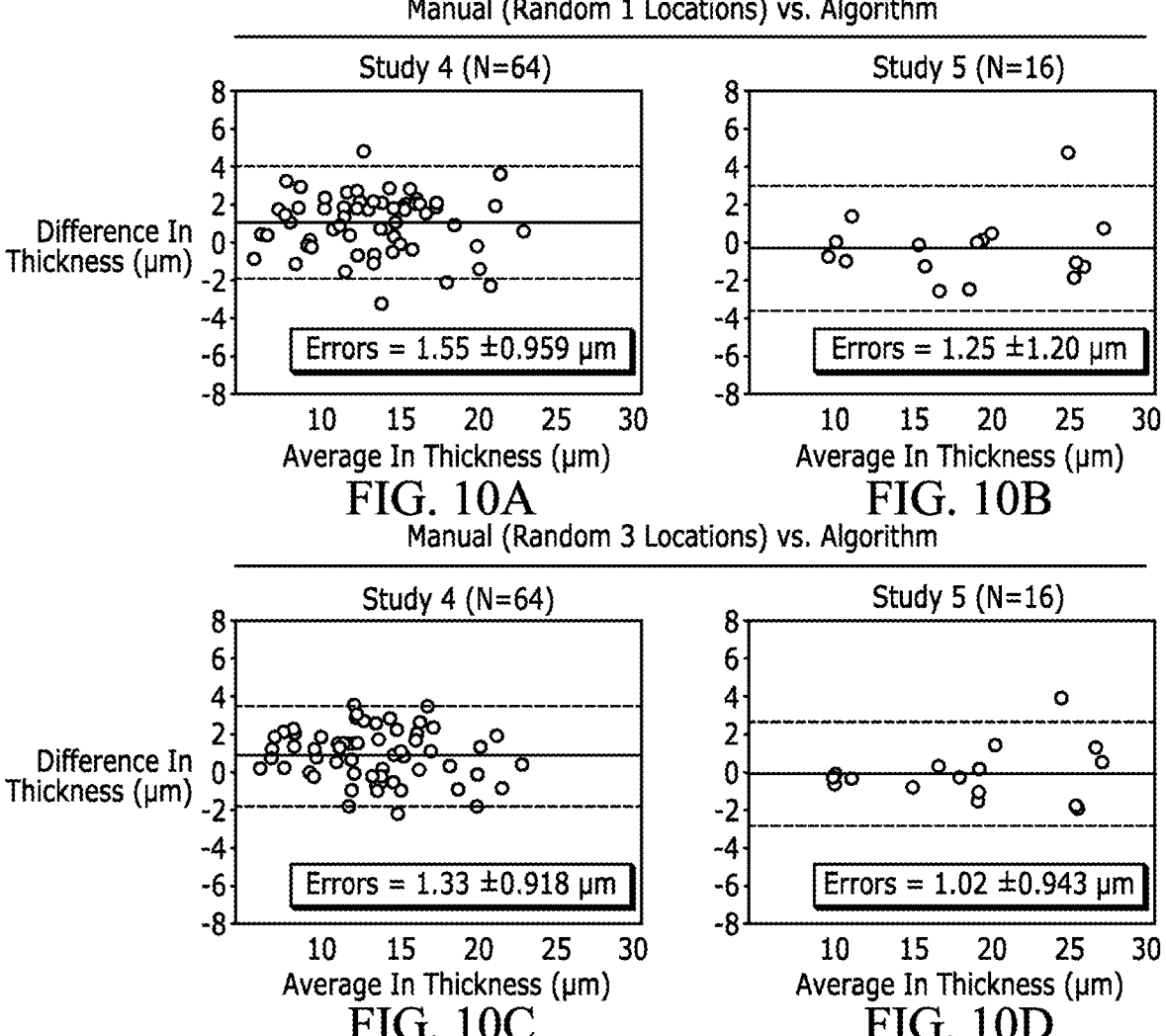
FIGS. 10A-10D illustrate example comparisons between viable epidermal thickness measured using the machine-learning model and measured by a pathologist.

The retrospective study also indicates differences in epidermal thickness may decrease with increasing manual measurements. To provide more accurate comparisons between the pathologist thickness evaluation and measurements of the epidermal area based on the machine-learning model, pathologist C used software to manually measure the epidermal thickness of three ROIs (locations) from a RHE tissue. One manual measurement was randomly selected from the three ROIs and compared to the thickness measured based on the machine-learning model. The comparison is based on Bland-Altman plots and absolute error and standard deviation were computed. FIGS. 10A-10D illustrate example comparisons between viable epidermal thickness measured using the machine-learning model and measured by a pathologist. FIG. 10A illustrates an example comparison between viable epidermal thickness measured by a pathologist and that measured based on the machine-learning model at one random location from a single tissue section for every sample in study 4. The absolute errors between the epidermal thickness measured based on the machine-learning model and the epidermal thickness measured by the pathologist were 1.55±0.959 μm for study 4. FIG. 10B illustrates an example comparison between viable epidermal thickness measured by a pathologist and that measured based on the machine-learning model at one random location from a single tissue section for every sample in study 5. The absolute errors between the epidermal thickness measured based on the machine-learning model and the epidermal thickness measured by the pathologist were 1.25±1.200 μm for study 5. FIG. 10C illustrates an example comparison between viable epidermal thickness measured by a pathologist and that measured based on the machine-learning model at three random locations from a single tissue section for every sample in Study 4. The measured thicknesses from multiple locations were averaged. FIG. 10D illustrates an example comparison between viable epidermal thickness measured by a pathologist and that measured based on the machine-learning model at three random locations from a single tissue section for every sample in study 5. For FIGS. 10C-10D, the measured thicknesses from multiple locations were averaged. When all three ROIs were used to compute the average measured thickness from the pathologist, the absolute errors between the algorithm measured and the pathologist measured epidermal thickness were reduced to 1.33±0.918 μm and 1.02±0.943 μm for study 4 and study 5, respectively. These results may suggest that as the number of manual pathologist measurements and ROIs increase, the measured thickness may become more similar to the results measured based on the machine-learning model.

Figure 11A:
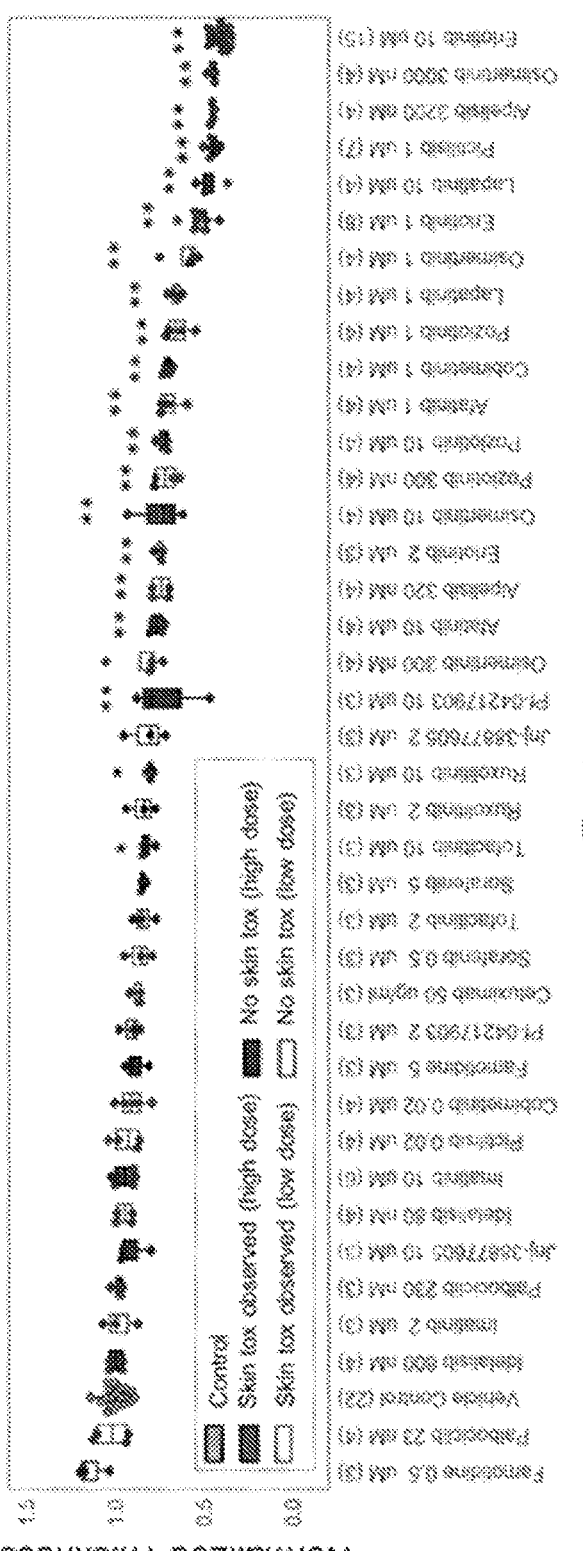
FIG. 11A illustrates example normalized viable epidermal thickness from various compounds under different concentrations.
Figure 11B:
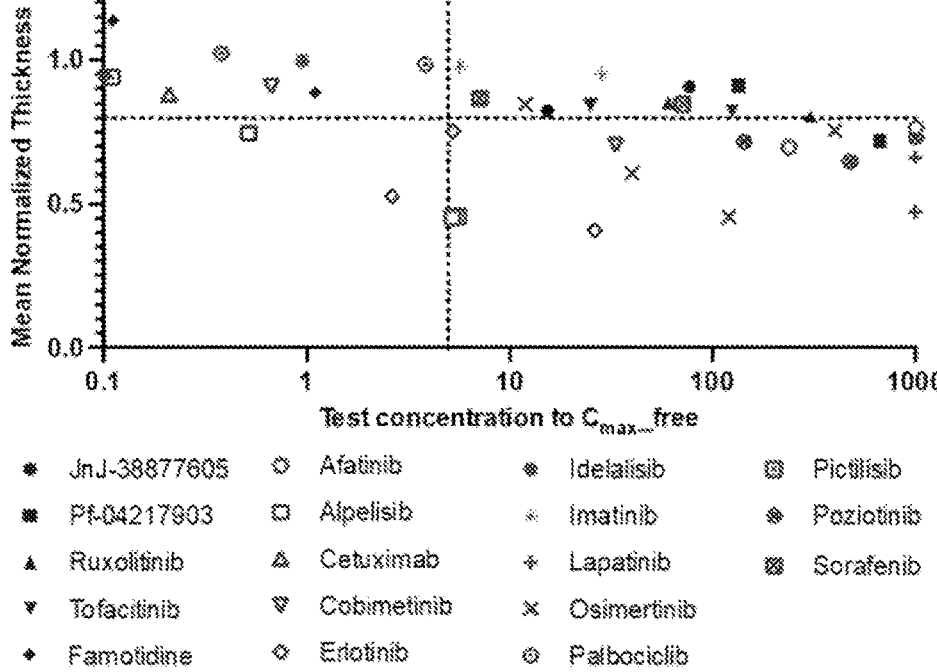
FIG. 11B illustrates an example impact of the in vitro test concentration on the epidermal thickness for compounds showing skin toxicity and those that do not.

In particular embodiments, normalized epidermal thickness may enable cross-study comparison and reveal potential clinical toxicity. Normalized epidermal thickness of compounds with clinical observations were extracted from studies 1, 2, 3, 4, and 5, and the correlation of epidermal thickness and clinical skin toxicity was analyzed retrospectively. Clinical skin toxicity may be defined as rash, pruritus, acne, dermatitis, alopecia, and/or dry skin described in the labels for marketed compounds, or publications reporting safety of compounds under clinical development. FIG. 11A illustrates example normalized viable epidermal thickness from various compounds under different concentrations. The normalized thickness is obtained based on the machine-learning model. The results were ordered by the median epidermal thickness from each experiment across the studies. A conventional method for multiple comparison was used. In FIG. 11A, numbers in the parentheses show the sample sizes (*: $p<0.05$, **: $p<0.01$). Three samples in study 1 that were dosed at 10 times the clinically relevant concentration were removed from this analysis. A total of eight compounds (afatinib, alpelisib, erlotinib, cobimetinib, osimertibib, poziotinib, lapatinib and pictilisib) with a significant decrease in epidermal thickness demonstrated clinical toxicity. Conversely, three compounds (tofacitinib, ruxolitnib, Pf-04217903) with significant decrease in epidermal thickness did not exhibit clinical toxicity. Except Pf-04217903 (10 μM), all compounds with a normalized epidermal thickness decrease of greater than 20% demonstrated clinical toxicity. Accordingly, determining the toxicity indication of the treatment by the drug compound based on the normalized thickness of the identified target layer (e.g., epidermal layer 312) may comprise comparing the normalized thickness with a threshold thickness value. In particular embodiments, the threshold may be determined based on machine-learning approaches. As an example and not by way of limitation, such approaches may be based on unsupervised learning. In alternative embodiments, determining the toxicity indication of the treatment by the drug compound based on the normalized thickness of the identified target layer (e.g., epidermal layer 312) may be based on another machine-learning model trained to determine the toxicity indication based on the normalized thickness. FIG. 11B illustrates an example impact of the in vitro test concentration on the epidermal thickness for compounds showing skin toxicity and those that do not. Horizontal dashed line indicates 20% decrease in normalized thickness. Vertical dashed line indicates 5-fold increase in concentration compared to the clinical exposure. In particular embodiments, the digital pathology image processing system 110 may receive a confirmation of the toxicity of the treatment by the drug compound. As an example and not by way of limitation, such confirmation may comprise one or more of a patient outcome based on the drug compound, a result of further testing (such as more focused testing of the drug compound initiated based on the toxicity indication), or a cross-study comparison. The digital pathology image processing system 110 may further retrain the machine-learning model based on the confirmation.

Table 4 illustrates the comparison of test concentration and clinical plasma exposure to test compounds. Mean value of normalized thickness for different compounds in the context of test concentrations and clinical exposure is displayed. Most of the skin toxic compounds decreased epidermal thickness by more than 20% at concentrations greater than 5-fold of clinical exposure (maximal free concentrations measured in plasma, $C_{max}$_free). In contrast, most of the non-toxic compounds decreased epidermal thickness by less than 20% even at relatively high concentrations (5-fold higher than $C_{max}$_free). Interestingly, a B-Raf inhibitor (XL-281) demonstrated an increase in epidermal thickness both by pathologist score and by the machine-learning model (albeit not statistically significant), indicating that compounds that induced hyperplastic toxicity may also be picked up with our machine-learning model. A cut of 0.80 (median normalized thickness from the Osimertinib 300 nM group) was used to compute the sensitivity and specificity for classifying skin toxicity with our machine-learning model.

TABLE 4

Comparison of test concentration and clinical plasma exposure to test compounds.

| Compound | Concentration (uM) | $C_{max}$_free (uM) | PK Reference | Fold to $C_{max}$_free | Skin tox. | Normalized thickness |
|---|---|---|---|---|---|---|
| Jnj-38877605 | 10 | 0.13* | 39, 40 | 76.9 | No | 0.91 |
| Jnj-38877605 | 2 | 0.13* | 39, 40 | 15.4 | No | 0.82 |
| Pf-04217903 | 10 | 0.015 | 41 | 666.7 | No | 0.72 |
| Pf-04217903 | 2 | 0.015 | 41 | 133.3 | No | 0.91 |
| Ruxolitinib | 10 | 0.033 | 42, 43 | 303.0 | No | 0.81 |
| Ruxolitinib | 2 | 0.033 | 42, 43 | 60.6 | No | 0.85 |
| Tofacitinib | 2 | 0.08 | (tofacitinib label)[44] | 25.0 | No | 0.84 |
| Tofacitinib | 10 | 0.08 | (tofacitinib label)[44] | 125.0 | No | 0.82 |
| XL281 | 0.5 | 4.5* | 45 | 0.1 | No | 1.14 |
| XL281 | 5 | 4.5* | 45 | 1.1 | No | 0.89 |
| Afatinib | 10 | 0.0042 | 46 | >1000 | Yes | 0.77 |
| Afatinib | 1 | 0.0042 | 46 | 238.1 | Yes | 0.70 |
| Alpelisib | 0.32 | 0.61 | (alpelisib label) | 0.5 | Yes | 0.75 |
| Alpelisib | 3.2 | 0.61 | (alpelisib label) | 5.2 | Yes | 0.45 |
| Cetuximab | 50 ug/ml | 235 ug/mL | (cetuximab label) | 0.2 | Yes | 0.88 |
| Cobimetinib | 0.02 | 0.03 | (cobimetinib label) | 0.7 | Yes | 0.91 |
| Cobimetinib | 1 | 0.03 | (cobimetinib label) | 33.3 | Yes | 0.71 |
| Erlotinib | 2 | 0.38 | 47 | 5.3 | Yes | 0.75 |
| Erlotinib | 1 | 0.38 | 47 | 2.6 | Yes | 0.53 |
| Erlotinib | 10 | 0.38 | 47 | 26.3 | Yes | 0.41 |
| Idelalisib | 0.8 | 0.84 | (idelalisib label)48 | 1.0 | Yes | 1.00 |
| Idelalisib | 0.08 | 0.84 | (idelalisib label)48 | 0.1 | Yes | 0.95 |
| Imatinib | 10 | 0.35 | 49 | 28.6 | Yes | 0.95 |
| Imatinib | 2 | 0.35 | 49 | 5.7 | Yes | 0.98 |
| Lapatinib | 1 | 0.000039 | (lapatinib label) | >1000 | Yes | 0.66 |
| Lapatinib | 10 | 0.000039 | (lapatinib label) | >1000 | Yes | 0.47 |
| Osimertinib | 0.3 | 0.025 | 50 | 12.0 | Yes | 0.85 |
| Osimertinib | 10 | 0.025 | 50 | 400.0 | Yes | 0.76 |
| Osimertinib | 1 | 0.025 | 50 | 40.0 | Yes | 0.61 |
| Osimertinib | 3 | 0.025 | 50 | 120.0 | Yes | 0.45 |
| Palbociclib | 0.023 | 0.06 | (palbociclib label)[51] | 0.4 | Yes | 1.02 |
| Palbociclib | 0.23 | 0.06 | (palbociclib label)[51] | 3.8 | Yes | 0.99 |
| Pictilisib | 0.02 | 0.18 | 52, 53 | 0.1 | Yes | 0.94 |
| Pictilisib | 1 | 0.18 | 52, 53 | 5.6 | Yes | 0.46 |
| Poziotinib | 10 | 0.0021 | 54 | >1000 | Yes | 0.73 |
| Poziotinib | 0.3 | 0.0021 | 54 | 142.9 | Yes | 0.72 |
| Poziotinib | 1 | 0.0021 | 54 | 476.2 | Yes | 0.65 |
| Sorafenib | 0.5 | 0.07 | 55 | 7.1 | Yes | 0.87 |
| Sorafenib | 5 | 0.07 | 55 | 71.4 | Yes | 0.85 |

*Plasma protein binding unavailable. Total concentration used in fold calculation.

Table 5 summarizes the performance of using epidermal thickness alone and in combination with testing concentrations to identify skin toxic compounds retrospectively. Given the fact that only one compound causes hyperplastic toxicity in this retrospective analysis, it may be impossible to identify a threshold for an increase of epidermal thickness to capture skin toxicity. Thus, XL-281 was not included in performance analysis.

TABLE 5

Performance summary of epidermal thickness alone and in combination with testing concentration to identify skin toxic compounds retrospectively.

| Inclusion criteria | Number of drugs | True positive | False positive | True negative | False negative | Sensitivity | Specificity |
|---|---|---|---|---|---|---|---|
| All compounds (exclude XL-281) | 17 | 8 | 1 | 3 | 5 | 0.62 | 0.75 |
| Only include compounds that were tested at concentrations >5-fold clinical exposure | 14 | 8 | 1 | 3 | 2 | 0.80 | 0.75 |

The embodiments disclosed herein demonstrated a skin toxicity risk threshold that corresponded with a 20% decrease in epidermal thickness in the RHE model. Although histopathology represents an important source of descriptive data in biomedical research, the use of tissue scoring may have enhanced reproducibility of research studies. However, this traditional method of pathological scoring may be semi-quantitative, thus being subjective to bias, and very time-consuming. Additionally, pathologists may often use different scoring systems to evaluate microscopic changes including skin thickness (as indicated in Table 3), making it challenging to differentiate between subtle reductions in epidermal thickness and impossible to compare across studies that were scored by different pathologists. As demonstrated by the data collected, by utilizing thickness measured based on the machine-learning model, the scoring may be better understood and further normalized. The embodiments disclosed herein may empower a rapid, quantitative, and accurate measurement of epidermal thickness to capture subtle reductions, on the micron level, that may normally go unnoticed with traditional pathological evaluation. Besides improving scoring for epidermal thickness, the scoring derived from the embodiments disclosed herein may also help in the evaluation of thickness of other multi-layered tissues such as the retina.

The subtle changes in thickness as well as a lack of quantitative endpoints may make it difficult to evaluate thickness, particularly for studies with large sample sizes. In the retrospective study disclosed herein, significant correlations may be observed between the algorithm measured tissue thickness (e.g., epidermal thickness) and pathologist scores for studies 1, 2, 4 and 5. Additionally, the smaller the sample size, the stronger the correlation (R=−0.84, −0.76, −0.67 and −0.62 when N=16, 44, 64 and 96, respectively in FIGS. 9A-9D). This may suggest that manual evaluation of the tissue thickness (e.g., epidermal thickness) may be more challenging present in the central portion of the tissue, harvesting-related artifacts at the edge of the samples and detachment of the basal lamina may further challenge the scoring process. To capture any meaningful variation, the pathologists may typically select multiple regions of interest in adequately preserved areas, take measurements and report the median value from the selected regions. FIGS. 10A-10D demonstrate that digital tools may minimize the discrepancy between manual measurements and measurements based on the machine-learning model to less than two microns. Furthermore, this discrepancy may be reduced as more manual measurements are made.

Several factors may potentially impact the manual measurements made by pathologists. As an example and not by way of limitation, different manual methods may result in varying thickness measurements. Thickness measured vertically from the basement membrane may easily vary from measurements made perpendicular to the basement membrane for the same sample. The number of measured regions may also affect the measured value due to thickness variation of the epidermal area. Lastly, ROI selection and the measurement starting and ending point may be difficult to reproduce. Therefore, it may be possible that the same sample may result in different thickness values during repetitive experiments. While our results showed that the discrepancy between manual measurements and measurements based on the machine-learning model were small, manual measurements may be subjective, not-reproducible, time-consuming, not scalable and thus not recommended, particularly when a large sample size is involved.

One caveat of the RHE model 300 may be that it does not contain melanocytes nor an immune component. Human skin is characterized by a variable number of epidermal and hair melanocytes, and it contains various immune cell populations, including Langerhans cells, macrophages, mast cells, and T cells in the dermis. The lack of the aforementioned components may render the RHE model 300 of limited immunologic significance and preclude the evaluation of melanocyte contribution to drug-induced cutaneous toxicity. Nevertheless, the sole presence of keratinocytes may provide the advantage of examining the drug effects on a single cell population without any confounding influences from other cell populations. Aside from measuring the epidermal thickness, the qualitative microscopic evaluation of the samples may provide further insights into pathologic findings that may influence the thickness itself. As an example and not by way of limitation, the presence of widespread epidermal necrosis with no remaining measurable layer translated in a score of zero. Conversely, the presence of vacuolar degeneration with insights into pathologic findings that may influence the thickness itself. As an example and not by way of limitation, the presence of widespread epidermal necrosis with no remaining measurable layer translated in a score of zero. Conversely, the presence of vacuolar degeneration with enlarged, swollen keratinocytes translated into minor decrease in epidermal thickness, thus leading to a score that was lower than expected. As such, a qualitative microscopic evaluation may remain pivotal in uncovering underlying factor that may influence the interpretation of the automated scoring system for epidermal thickness.

In the oncology field, a papulopustular rash mostly affecting face and upper trunk has been reported in a high percentage of patients treated with EGFR inhibitors. This on-target effect may be not surprising and, given that this toxicity represents an indicator of clinical efficacy, patients may be often dosed to rash. The retrospective analysis disclosed herein may have confirmed that the RHE model 300 may be a useful tool for measuring skin toxicity following EGFR inhibition (afatinib, erlotinib, lapatinib, osimertinib, and poziotinib as examples). In addition, the RHE model 300 may be responsive to drugs that inhibit PI3Kα/δ (pictilisib), PI3Kα (alpelisib), and MEK (cobimetinib), recapitulating the clinical cutaneous toxicity phenotype 8, 14, 31. In comparison, the kinase inhibitors imatinib (up to 29-fold over clinical $C_{max}$_free) and sorafenib (up to 71-fold over clinical $C_{max}$_free), failed to cause any meaningful change in epidermal thickness, as indicated in FIG. 11A. Since immune mechanisms seem to be involved in the imatinib-associated skin rash observed clinically, it may be not surprising that epidermal effects are not reproduced by the RHE model 300. Similarly, for sorafenib, the higher drug concentration observed in the areas of rash appears to be related to the eccrine activity of the skin, which may not be recapitulated by the RHE model 300 given the absence of sweat glands. As such, the RHE model 300 may not be sensitive to certain signal pathway inhibitor-induced skin toxicity, including BCR-ABL and Raf, with few caveats. Adverse epidermal proliferative lesions have been reported in patients with BRAF-V600 mutated metastatic melanoma when treated with certain B-Raf inhibitors due to paradoxical MAPK pathway activation. In this instance, the epidermal hyperplasia induced by these B-Raf inhibitors at lower pharmacologically relevant concentrations appears to be reproduced by the RHE model 300, while manifesting as epidermal thinning and toxicity at suprapharmacologic higher concentrations. Here, increased epidermal thickness has been confirmed in Raf inhibitor-treated RHE model and correlated with epidermal hyperplasia and the induction of epidermal tumors observed preclinically and clinically. Thus, the predictive value of the RHE model 300 may be dependent on the mechanism of action as well as the concentration of each compound teste.

The prediction value of the RHE model 300 may also need to be put into context of compound test concentrations. Non-toxic compounds cause less than 20% epidermal thinning regardless of the testing concentration (from 0.1-fold to 300-fold over clinical $C_{max}$_free). Thus, the specificity of the RHE model 300 may be similar across different inclusion criteria for the test concentrations. However, the retrospective analysis showed that skin-toxic compounds decreased epidermal thickness when tested at concentrations equivalent to 5-fold the therapeutic clinical exposure (FIG. 11B). The sensitivity of the RHE model 300 increased from 0.62 to 0.8 and the specificity decreased from 0.8 to 0.75 when adding the test concentration in the inclusion criteria for predictively analysis (Table 5).

In the embodiments disclosed herein, the RHE model 300 was treated with test compounds for four days, which is shorter than the time course for skin toxicity manifestation in clinic. Due to these considerations, the compound concentrations required to cause changes in the epidermal thickening in the RHE model 300 may be higher than the maximal exposure seen in clinic. Thus, the RHE model 300 may only have good predictive value when compounds are tested at concentrations equivalent to 5-fold the therapeutic clinical exposure or higher.

As discussed above, deep learning and image processing algorithms may provide quantitative endpoints of epidermal thickness. The embodiments disclosed herein demonstrated that this computed epidermal thickness from the RHE model 300 may reflect potential clinical skin toxicity. The embodiments disclosed herein may be fully automated, scalable and reproducible. Therefore, the embodiments disclosed herein may potentially enhance the throughput for compound screening. With time, as more quantitative data are collected, confidence in predicting clinical skin toxicity may only grow.

Figure 12:
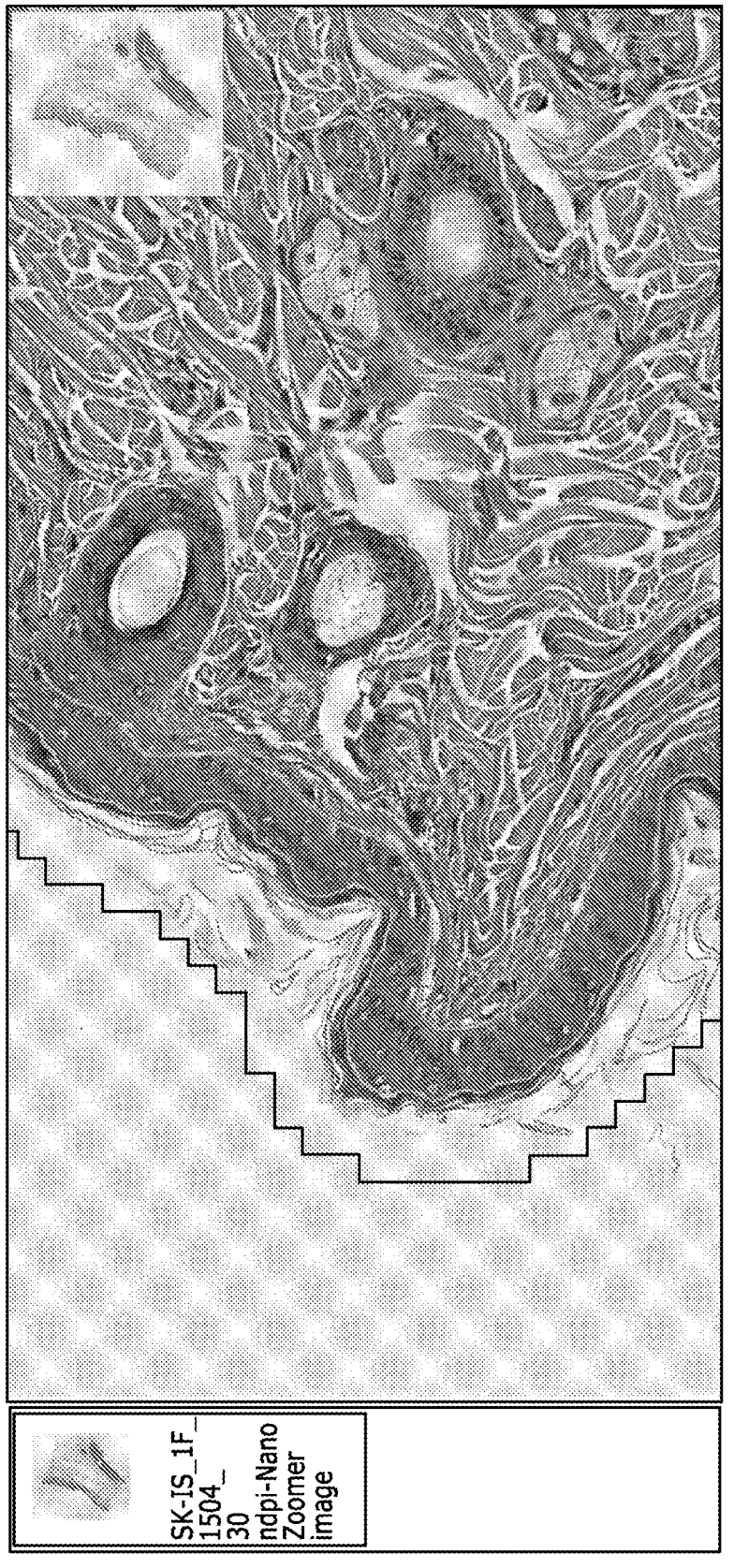
FIG. 12 illustrates an example segmentation of a tissue sample.

In particular embodiments, the machine-learning model may be used to identify other features of the RHE samples 310. As an example and not by way of limitation, such features may comprise colors, cell sizes, cell morphology, different cell types, etc. The machine-learning model may be also used for in vivo skins such as biopsy from either animals or humans as long as thickness measurement is of interest. As an example and not by way of limitation, the embodiments disclosed herein may provide more evaluation or provide a diagnosis to pathologist for in vivo biopsies. The embodiments disclosed herein may be also used to determine the density of cells within the viable epidermal layer given high-enough resolution and identify different cell types (e.g., looking for specific types of cell-death) during the segmentation process. As an example and not by way of limitation, rather than just counting up the layers, the embodiments disclosed herein may be used to perform a nuclei count. The machine-learning model may be further used in analysis of other organs. As an example and not by way of limitation, such organs may comprise an eye ball (i.e., different layers in the retina). FIG. 12 illustrates an example segmentation of a tissue sample. The tissue sample is a cyno skin. The tissue sample may have been cut with an angle. The embodiments disclosed herein may use the information that there are hair follicles in the cyno skin to estimate the thickness of the skin.

In particular embodiments, the machine-learning model may be also used for determining treatment efficacy based on the thickness of on one or more identified layers, such as the epidermal layer 312. The digital pathology image processing system 110 may receive a querying image associated with a reconstructed human epidermis (RHE) sample 310 after a treatment by a drug compound. The digital pathology image processing system 110 may then identify, based on a machine-learning model trained to identify layers of RHE samples 310, an epidermal layer 312 of the RHE sample 310. In particular embodiments, the digital pathology image processing system 110 may calculate a normalized thickness of the identified epidermal layer 312. The digital pathology image processing system 110 may further determine an efficacy indication of the treatment by the drug compound based on the normalized thickness of the identified epidermal layer 312. In particular embodiments, determining the efficacy indication of the treatment by the drug compound based on the normalized thickness of the identified epidermal layer may comprise comparing the normalized thickness with a threshold thickness value. In particular embodiments, the threshold may be determined based on machine-learning approaches such as unsupervised learning. In alternative embodiments, determining the efficacy indication of the treatment by the drug compound based on the normalized thickness of the epidermal layer 312 may be based on another machine-learning model trained to determine the efficacy indication based on the normalized thickness. In particular embodiments, the digital pathology image processing system 110 may receive a confirmation of the efficacy of the treatment by the drug compound. As an example and not by way of limitation, such confirmation may comprise one or more of a patient outcome based on the drug compound, a result of further testing (such as more focused testing of the drug compound initiated based on the efficacy indication), or a cross-study comparison. The digital pathology image processing system 110 may further retrain the machine-learning model based on the confirmation.

Figure 13A:
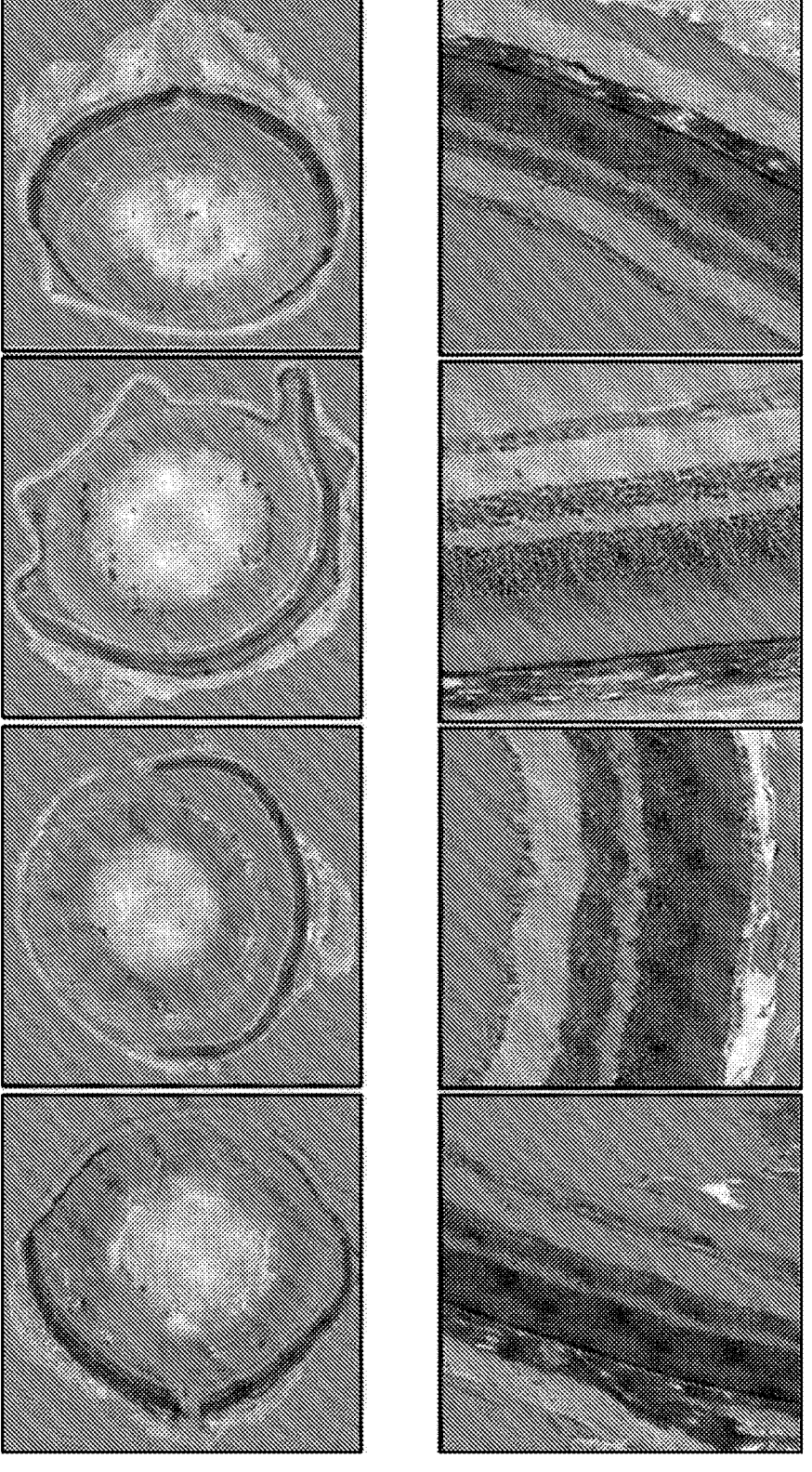
FIG. 13A-13C illustrate example tissue segmentations.
Figure 13B:
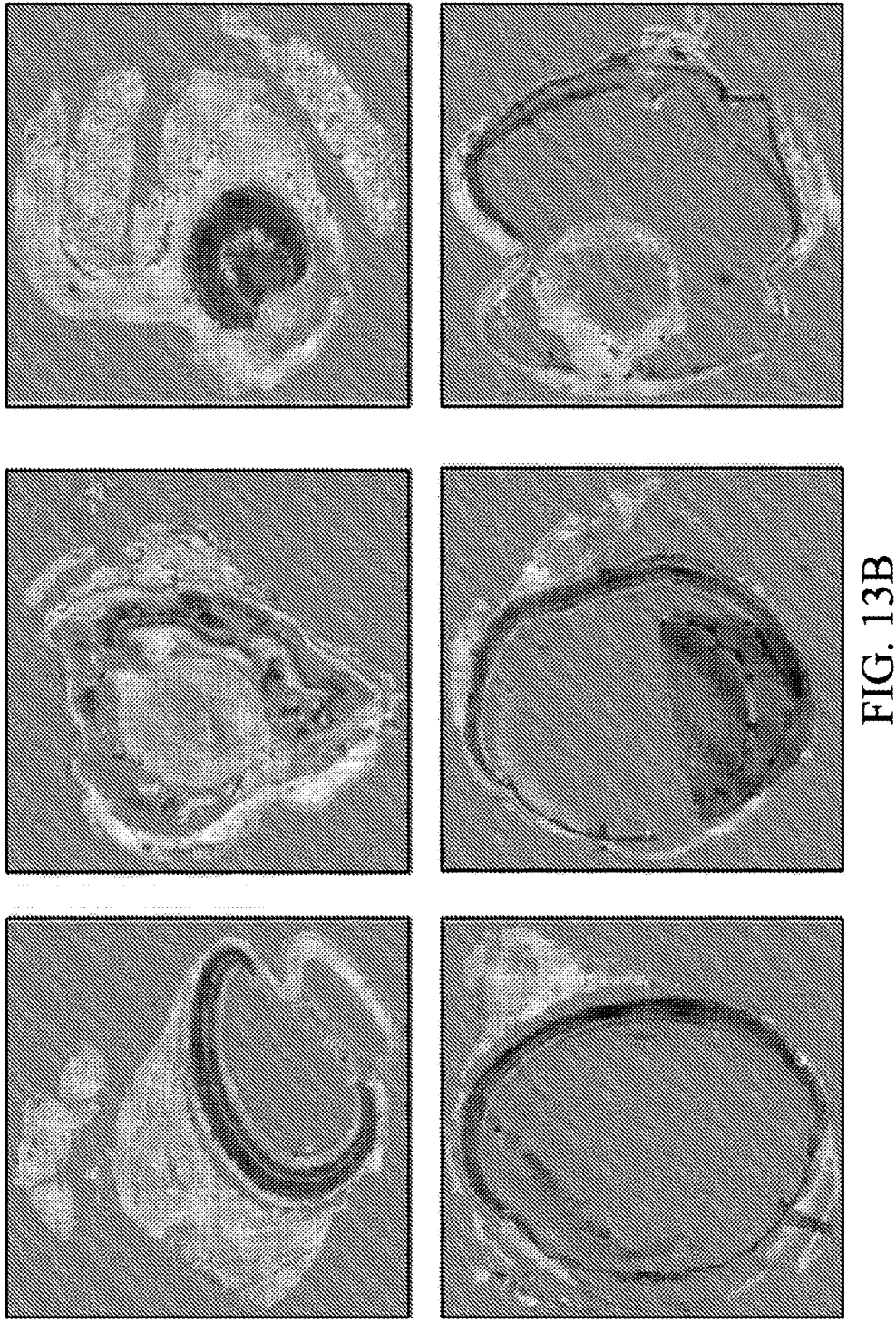
Figure 13C:
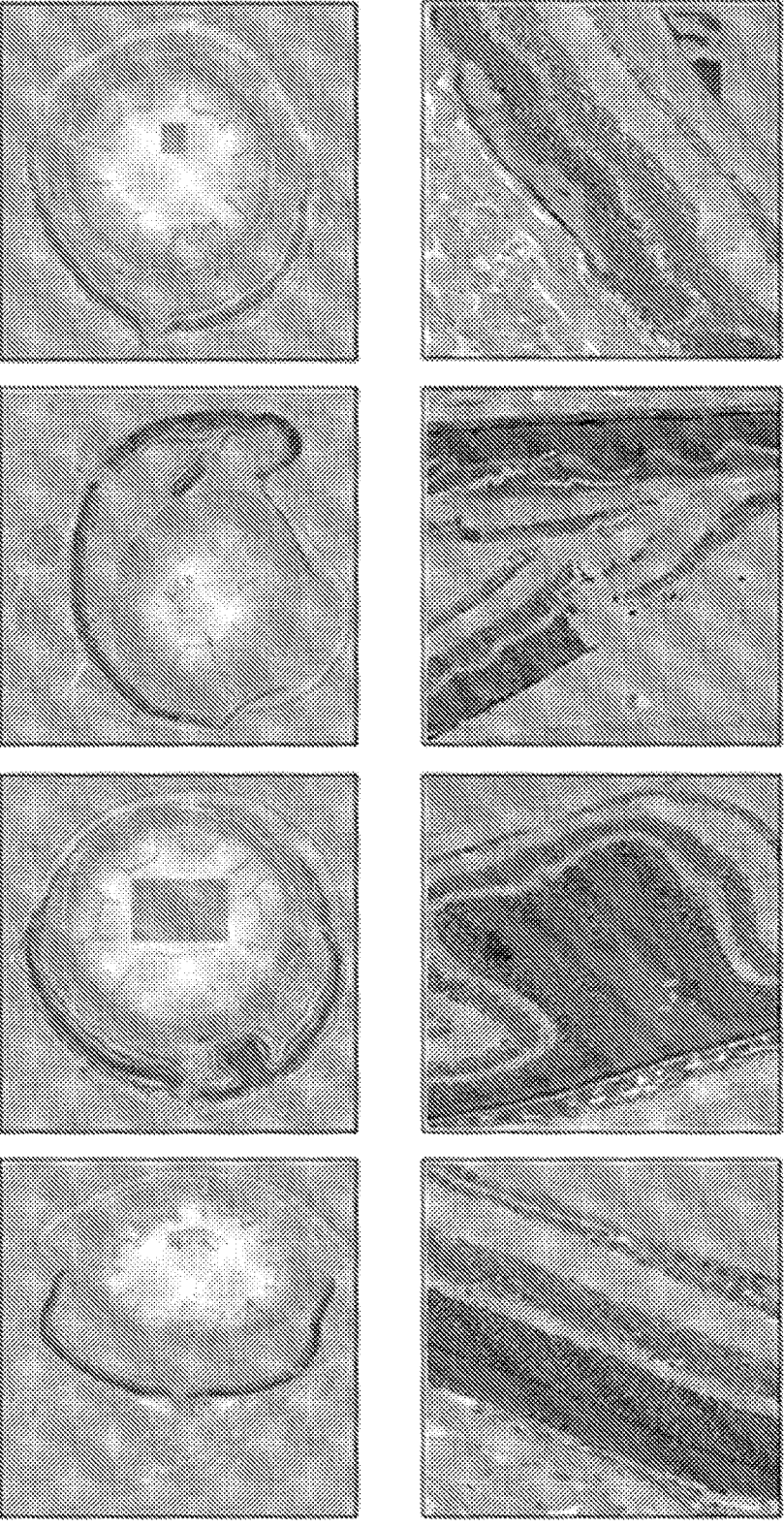

In particular embodiments, the machine-learning model may be additionally used for retina segmentation of retina and thickness measurement of the retina. In this case, the tissue sample may comprise a reconstructed eye sample and the identified target layer may comprise a retina layer. In particular embodiments, the digital pathology image processing system 110 may train the machine-learning model based on a plurality of training images. Each training image may be associated with a reconstructed eye sample. Each training image may comprises a plurality of image tiles. In particular embodiments, each of the plurality of image tiles may comprise a plurality of pixels. Each of the plurality of pixels may be associated with an annotation indicting whether the corresponding pixel belong to a retina layer. Based on such machine-learning model, one may segment retina within the images of eyes, e.g., eight retina layers. In particular embodiments, the digital pathology image processing system 110 may further measure the thickness of the segmented retina. The measured thickness may be also relative thickness not just the raw values. FIGS. 13A-13C illustrate example tissue segmentations. FIG. 13A illustrates example retina segmentations from a first study. In the first study, the retina segmentations may correspond to ideal eyeballs with distinct layers. FIG. 13B illustrates example retina segmentations from a second study. In the second study, the retina segmentations may correspond to eyeballs with artifacts or eyeballs where the tissues were cut at the edge of the eyeballs. These eyeballs may be less ideal for the evaluation, i.e., thickness comparison. FIG. 13C illustrates example retina segmentations from a third study. In the third study, the retina segmentations may correspond to eyeballs that are less ideal than those in the first study but more ideal than those in the second study.

Figure 14B:
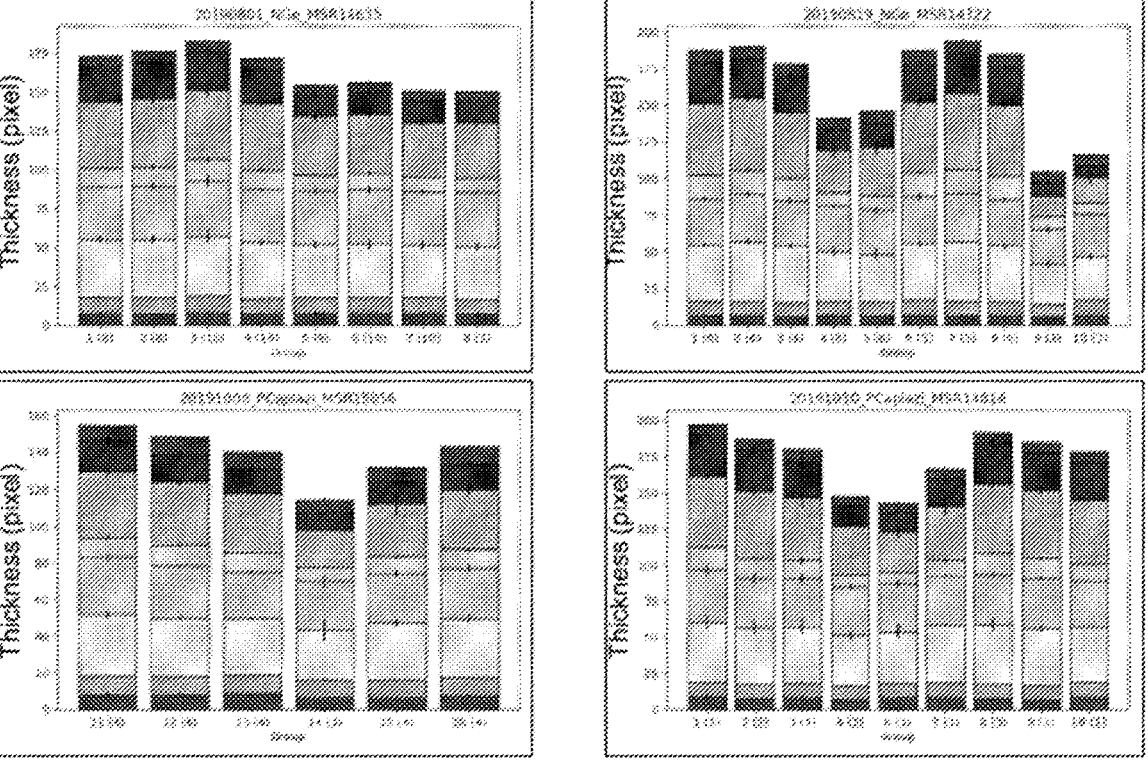

FIGS. 14A-14B illustrate example measured tissue segment thickness. FIG. 14A illustrates example measured retina thickness from the first study. In particular, group 3 and group 4 in the top right barograph show smaller thickness compared to group 1 and group 2. This observation may suggest that there may be toxicity that affects the normal pathology of the retina. By contrast, the thicknesses for the four groups look similar for the rest of the barographs. FIG. 14B illustrates example measured retina thickness from the second study.

As can be seen, the embodiments disclosed herein may be beneficial for a variety of application when the tissues of interest are composed of multiple layers (e.g., the retina) because of the intrinsic ability of the embodiments disclosed herein to detect changes in the thickness of specific layers.

Figure 15:
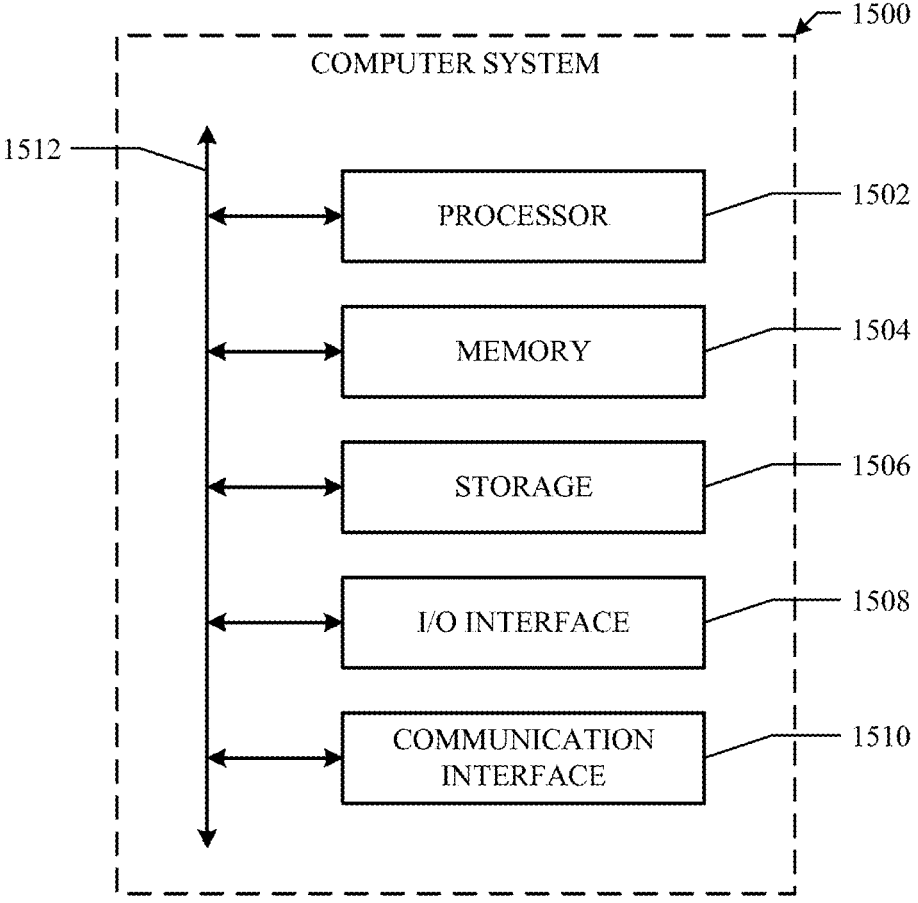
FIG. 15 illustrates an example of a computing system.

FIG. 15 illustrates an example computer system 1500. In particular embodiments, one or more computer systems 1500 perform one or more steps of one or more methods described or illustrated herein. In particular embodiments, one or more computer systems 1500 provide functionality described or illustrated herein. In particular embodiments, software running on one or more computer systems 1500 performs one or more steps of one or more methods described or illustrated herein or provides functionality described or illustrated herein. Particular embodiments include one or more portions of one or more computer systems 1500. Herein, reference to a computer system may encompass a computing device, and vice versa, where appropriate. Moreover, reference to a computer system may encompass one or more computer systems, where appropriate.

This disclosure contemplates any suitable number of computer systems 1500. This disclosure contemplates computer system 1500 taking any suitable physical form. As example and not by way of limitation, computer system 1500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1500 may include one or more computer systems 1500; be unitary or distributed; span multiple locations; span multiple machines; span multiple data centers; or reside in a cloud, which may include one or more cloud components in one or more networks. Where appropriate, one or more computer systems 1500 may perform without substantial spatial or temporal limitation one or more steps of one or more methods described or illustrated herein. As an example and not by way of limitation, one or more computer systems 1500 may perform in real time or in batch mode one or more steps of one or more methods described or illustrated herein. One or more computer systems 1500 may perform at different times or at different locations one or more steps of one or more methods described or illustrated herein, where appropriate.

In particular embodiments, computer system 1500 includes a processor 1502, memory 1504, storage 1506, an input/output (I/O) interface 1508, a communication interface 1510, and a bus 1512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1502 includes hardware for executing instructions, such as those making up a computer program. As an example and not by way of limitation, to execute instructions, processor 1502 may retrieve (or fetch) the instructions from an internal register, an internal cache, memory 1504, or storage 1506; decode and execute them; and then write one or more results to an internal register, an internal cache, memory 1504, or storage 1506. In particular embodiments, processor 1502 may include one or more internal caches for data, instructions, or addresses. This disclosure contemplates processor 1502 including any suitable number of any suitable internal caches, where appropriate. As an example and not by way of limitation, processor 1502 may include one or more instruction caches, one or more data caches, and one or more translation lookaside buffers (TLBs). Instructions in the instruction caches may be copies of instructions in memory 1504 or storage 1506, and the instruction caches may speed up retrieval of those instructions by processor 1502. Data in the data caches may be copies of data in memory 1504 or storage 1506 for instructions executing at processor 1502 to operate on; the results of previous instructions executed at processor 1502 for access by subsequent instructions executing at processor 1502 or for writing to memory 1504 or storage 1506; or other suitable data. The data caches may speed up read or write operations by processor 1502. The TLBs may speed up virtual-address translation for processor 1502. In particular embodiments, processor 1502 may include one or more internal registers for data, instructions, or addresses. This disclosure contemplates processor 1502 including any suitable number of any suitable internal registers, where appropriate. Where appropriate, processor 1502 may include one or more arithmetic logic units (ALUs); be a multi-core processor; or include one or more processors 1502. Although this disclosure describes and illustrates a particular processor, this disclosure contemplates any suitable processor.

In particular embodiments, memory 1504 includes main memory for storing instructions for processor 1502 to execute or data for processor 1502 to operate on. As an example and not by way of limitation, computer system 1500 may load instructions from storage 1506 or another source (such as, for example, another computer system 1500) to memory 1504. Processor 1502 may then load the instructions from memory 1504 to an internal register or internal cache. To execute the instructions, processor 1502 may retrieve the instructions from the internal register or internal cache and decode them. During or after execution of the instructions, processor 1502 may write one or more results (which may be intermediate or final results) to the internal register or internal cache. Processor 1502 may then write one or more of those results to memory 1504. In particular embodiments, processor 1502 executes only instructions in one or more internal registers or internal caches or in memory 1504 (as opposed to storage 1506 or elsewhere) and operates only on data in one or more internal registers or internal caches or in memory 1504 (as opposed to storage 1506 or elsewhere). One or more memory buses (which may each include an address bus and a data bus) may couple processor 1502 to memory 1504. Bus 1512 may include one or more memory buses, as described below. In particular embodiments, one or more memory management units (MMUs) reside between processor 1502 and memory 1504 and facilitate accesses to memory 1504 requested by processor 1502. In particular embodiments, memory 1504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1504 may include one or more memories 1504, where appropriate. Although this disclosure describes and illustrates particular memory, this disclosure contemplates any suitable memory.

In particular embodiments, storage 1506 includes mass storage for data or instructions. As an example and not by way of limitation, storage 1506 may include a hard disk drive (HDD), a floppy disk drive, flash memory, an optical disc, a magneto-optical disc, magnetic tape, or a Universal Serial Bus (USB) drive or a combination of two or more of these. Storage 1506 may include removable or non-removable (or fixed) media, where appropriate. Storage 1506 may be internal or external to computer system 1500, where appropriate. In particular embodiments, storage 1506 is non-volatile, solid-state memory. In particular embodiments, storage 1506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1506 taking any suitable physical form. Storage 1506 may include one or more storage control units facilitating communication between processor 1502 and storage 1506, where appropriate. Where appropriate, storage 1506 may include one or more storages 1506. Although this disclosure describes and illustrates particular storage, this disclosure contemplates any suitable storage.

In particular embodiments, I/O interface 1508 includes hardware, software, or both, providing one or more interfaces for communication between computer system 1500 and one or more I/O devices. Computer system 1500 may include one or more of these I/O devices, where appropriate. One or more of these I/O devices may enable communication between a person and computer system 1500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1508 for them. Where appropriate, I/O interface 1508 may include one or more device or software drivers enabling processor 1502 to drive one or more of these I/O devices. I/O interface 1508 may include one or more I/O interfaces 1508, where appropriate. Although this disclosure describes and illustrates a particular I/O interface, this disclosure contemplates any suitable I/O interface.

In particular embodiments, communication interface 1510 includes hardware, software, or both providing one or more interfaces for communication (such as, for example, packet-based communication) between computer system 1500 and one or more other computer systems 1500 or one or more networks. As an example and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1510 for it. As an example and not by way of limitation, computer system 1500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1500 may include any suitable communication interface 1510 for any of these networks, where appropriate. Communication interface 1510 may include one or more communication interfaces 1510, where appropriate. Although this disclosure describes and illustrates a particular communication interface, this disclosure contemplates any suitable communication interface.

In particular embodiments, bus 1512 includes hardware, software, or both coupling components of computer system 1500 to each other. As an example and not by way of limitation, bus 1512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1512 may include one or more buses 1512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a digital pathology image processing system:
   receiving a querying image associated with a tissue sample after a treatment by a drug compound;
   identifying, based on a machine-learning model trained to identify layers of tissue samples, a target layer of the tissue sample;
   calculating a normalized thickness of the identified target layer, wherein calculating the normalized thickness comprises using an average thickness value for the identified target layer and an average thickness value of tissue samples from a control group; and
   determining a toxicity indication of the treatment by the drug compound based on the normalized thickness of the identified target layer.

2. The method of claim 1, wherein the tissue sample comprises a reconstructed human epidermis (RHE) sample, and wherein the identified target layer comprises an epidermal layer.

3. The method of claim 2, further comprising training the machine-learning model based on a plurality of training images, wherein each training image is associated with a RHE sample, wherein each training image comprises a plurality of image tiles, wherein each of the plurality of image tiles comprises a plurality of pixels, and wherein each of the plurality of pixels is associated with an annotation indicating whether the corresponding pixel belongs to a keratin layer or an epidermal layer.

4. The method of claim 1, further comprising training the machine-learning model based on a plurality of training images, wherein each training image is associated with a tissue sample, wherein each training image comprises a plurality of image tiles, wherein each of the plurality of image tiles comprises a plurality of pixels, and wherein each of the plurality of pixels is associated with an annotation indicting whether the corresponding pixel belongs to the target layer.

5. The method of claim 1, wherein the tissue sample comprises a reconstructed eye sample, and wherein the identified target layer comprises a retina layer.

6. The method of claim 5, further comprising training the machine-learning model based on a plurality of training images, wherein each training image is associated with a reconstructed eye sample, wherein each training image comprises a plurality of image tiles, wherein each of the plurality of image tiles comprises a plurality of pixels, and wherein each of the plurality of pixels is associated with an annotation indicating whether the corresponding pixel belongs to a retina layer.

7. The method of claim 1, further comprises:
   receiving a confirmation of the toxicity of the treatment by the drug compound; and
   retraining the machine-learning model based on the confirmation.

8. The method of claim 1, wherein the machine-learning model is based on a deep learning algorithm, and wherein an architecture of the deep learning algorithm is based on one or more of a U-net, a Resnet U-net, or a deep residual neural network.

9. The method of claim 1, wherein identifying the target layer comprises:
   cropping the querying image into a plurality of image tiles:
   inputting the plurality of image tiles to the machine-learning model; and
   resizing an output of the machine-learning model into a shape of the querying image.

10. The method of claim 1, wherein calculating the normalized thickness of the identified target layer comprises:
   determining a centerline for the identified target layer;
   identifying a plurality of locations associated with the identified target layer;
quantifying, based on the centerline, a thickness value for each of the plurality of locations;
   determining, the average thickness value for the identified target layer based on the plurality of thickness values for the plurality of locations; and
   dividing the average thickness value of the identified target layer by the average thickness value of the tissue samples from the control group.

11. The method of claim 1, wherein determining the toxicity indication of the treatment by the drug compound based on the normalized thickness of the identified target layer comprises:
   comparing the normalized thickness with a threshold thickness value.

12. A system comprising:
   one or more processors; and
   a non-transitory memory coupled to the processors comprising instructions executable by the processors, the processors operable when executing the instructions to:
   receive a querying image associated with a reconstructed human epidermis (RHE) sample after a treatment by a drug compound;
   identify, based on a machine-learning model trained to identify layers of RHE samples, an epidermal layer of the RHE sample;
   calculate a normalized thickness of the identified epidermal layer, wherein calculating the normalized thickness comprises using an average thickness value for the identified epidermal layer and an average thickness value of RHE samples from a control group; and
   determine a toxicity indication of the treatment by the drug compound based on the normalized thickness of the identified epidermal layer.

13. The system of claim 12, wherein the processors are further operable when executing the instructions to: train the machine-learning model based on a plurality of training images, wherein each training image is associated with a RHE sample, wherein each training image comprises a plurality of image tiles, wherein each of the plurality of image tiles comprises a plurality of pixels, and wherein each of the plurality of pixels is associated with an annotation indicating whether the corresponding pixel belongs to a keratin layer or an epidermal layer.

14. The system of claim 12, wherein the processors are further operable when executing the instructions to:

receive a confirmation of the toxicity of the treatment by the drug compound; and retrain the machine-learning model based on the confirmation.

15. The system of claim 12, wherein identifying the epidermal layer of the RHE sample comprises:

cropping the querying image into a plurality of image tiles;

inputting the plurality of image tiles to the machine-learning model; and resizing an output of the machine-learning model into a shape of the querying image.

16. The system of claim 12, wherein calculating the normalized thickness of the identified epidermal layer comprises:

determining a centerline for the identified epidermal layer; identifying a plurality of locations associated with the identified epidermal layer;

quantifying, based on the centerline, a thickness value for each of the plurality of locations;

determining, the average thickness value for the identified epidermal layer based on the plurality of thickness values for the plurality of locations; and dividing the average thickness value of the identified epidermal layer by the average thickness value of the RHE samples from the control group.

17. The system of claim 12, wherein determining the toxicity indication of the treatment by the drug compound based on the normalized thickness of the identified epidermal layer comprises:

comparing the normalized thickness with a threshold thickness value.

18. A system comprising:

one or more processors; and a non-transitory memory coupled to the processors comprising instructions executable by the processors, the processors operable when executing the instructions to:

receive a querying image associated with a reconstructed human epidermis (RHE) sample after a treatment by a drug compound;

identify, based on a machine-learning model trained to identify layers of RHE samples, an epidermal layer of the RHE sample;

calculate a normalized thickness of the identified epidermal layer, wherein calculating the normalized thickness comprises using an average thickness value for the identified epidermal layer and an average thickness value of RHE samples from a control group; and determine an efficacy indication of the treatment by the drug compound based on the normalized thickness of the identified epidermal layer.

19. The system of claim 18, wherein determining the efficacy indication of the treatment by the drug compound based on the normalized thickness of the identified epidermal layer comprises:

comparing the normalized thickness with a threshold thickness value.

20. The system of claim 18, wherein the processors are further operable when executing the instructions to:

receive a confirmation of the efficacy of the treatment by the drug compound; and retrain the machine-learning model based on the confirmation.

* * * * *